US012745116B2

(12) United States Patent
Chrabieh et al.

(10) Patent No.: US 12,745,116 B2
(45) Date of Patent: Sep. 22, 2026

(54) DEEP SCANNING SIGNAL MONITORING UNIT FOR DETERMINING CELLULAR NETWORK PARAMETERS

(71) Applicant: NextNav France, Puteaux (FR)

(72) Inventors: Rabih Chrabieh, Montrouge (FR); Arnaud Dumenil, Clamart (FR); Vinh Hoang Son Le, Massy (FR); Laurent Sibony, Saint-Germain-en-Laye (FR); Ganda Ouedraogo, Montévrain (FR)

(73) Assignee: NextNav France, Puteaux (FR)

( * ) Notice: Subject to any disclaimer, the term of this patent is extended or adjusted under 35 U.S.C. 154(b) by 252 days.

(21) Appl. No.: 18/761,975

(22) Filed: Jul. 2, 2024

(65) Prior Publication Data

US 2025/0119775 A1 Apr. 10, 2025

Related U.S. Application Data

(60) Provisional application No. 63/589,298, filed on Oct. 10, 2023.

(51) Int. Cl.
*H04W 24/08* (2009.01)

(52) U.S. Cl.
CPC .................................. *H04W 24/08* (2013.01)

(58) Field of Classification Search
None
See application file for complete search history.

(56) References Cited

U.S. PATENT DOCUMENTS

| | | | | |
|---|---|---|---|---|
| 12,621,194 | B2 * | 5/2026 | Kumari | H04L 27/2601 |
| 2011/0306340 | A1 * | 12/2011 | Lindoff | H04W 24/10<br>455/434 |
| 2017/0310436 | A1 * | 10/2017 | Nuzman | H04L 25/0224 |
| 2019/0072601 | A1 * | 3/2019 | Dzierwa | G01R 29/0892 |

FOREIGN PATENT DOCUMENTS

| | | | | |
|---|---|---|---|---|
| CN | 102804857 | A * | 11/2012 | H04W 36/322 |
| CN | 104040367 | A * | 9/2014 | G01S 3/74 |
| CN | 105744590 | A * | 7/2016 | H04W 40/32 |

* cited by examiner

*Primary Examiner* — Chirag G Shah
(74) *Attorney, Agent, or Firm* — MLO, a professional corp.

(57) ABSTRACT

A method involves receiving cellular signals from multiple base stations at a signal monitoring unit. A first long-duration signal accumulation of the cellular signals is performed. First cells associated with the base stations are identified using the first accumulated signal. First cellular network parameters associated with the first identified cells are stored. A signal contribution of the first identified cells is removed from the first cellular signals. A second long-duration signal accumulation of the first cellular signals is performed. Second cells associated with the plurality of base stations are identified using the second accumulated signal, the second identified cells having been obscured by the first cells before the signal contribution of the first cells was removed from the first cellular signals. Second cellular network parameters associated with the second identified cells are stored. The first and second cellular network parameters of the first and second identified cells are then tracked.

21 Claims, 11 Drawing Sheets

100
113a
110a
115b
Building 190b
Computing device(s) 120
115a
Building 190a
113c
110c
113b
110b
113d
110d
Distance Increasing
Distance Increasing
Signals to/from 100
Building 190
115a
110a
$113a^1$
$113c^3$
$113b^3$
$113d^3$
110b
110c
110d
115b
Building 190b
Distance Increasing
Distance Increasing
Signals to/from other systems
Server(s) 160

100
110a
$113a^2$
115b
Building 190b
$113c^3$
$113b^2$
110c
$113d^3$
115a
Building 190
110b
110d
Distance Increasing
Distance Increasing
Signals to/from other systems
Server(s)
160

200
Slot
Resource block 210a
Resource block 210b
Resource block 210n
OFDM Symbols in time domain 212
CRS Symbols 216
Subcarriers in frequency domain 214
1 Slot = 0.5 ms
Slots 206
0
1
2
3
16
17
18
19
Subframes 204
0
1
8
9
Frame 202
1 Subframe = 1 ms
1 Frame = 10ms

Figure 5:
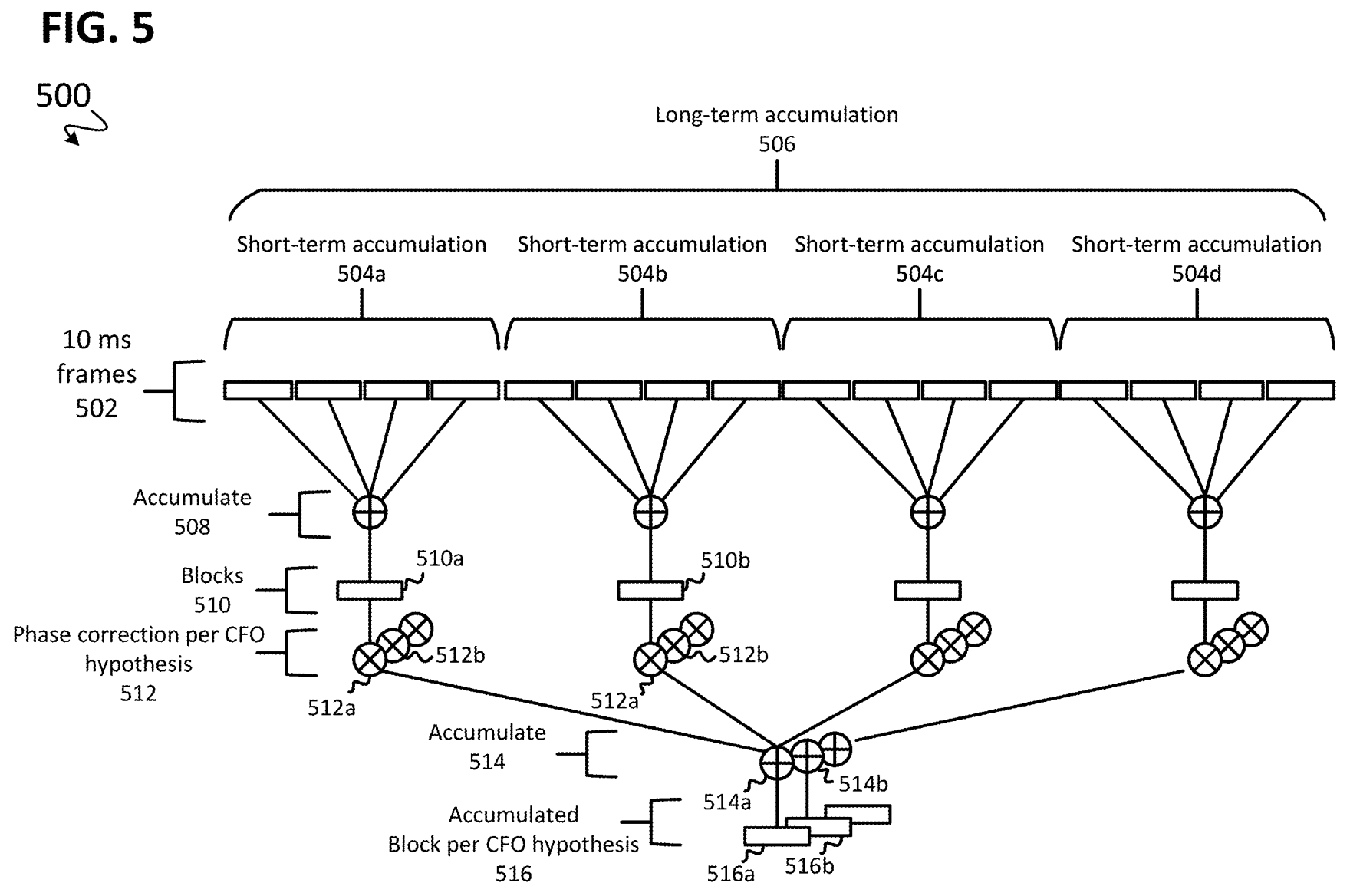

Long-term accumulation 506

Short-term accumulation 504a

Short-term accumulation 504b

Short-term accumulation 504c

Short-term accumulation 504d 10 ms frames 502

Accumulate 508

Blocks 510

Phase correction per CFO hypothesis 512

510a

510b

512a

512b

Accumulate 514

514a

514b

Accumulated Block per CFO hypothesis 516

516a

516b

700
At Cell 1 (Tx)
At Cell 2 (Tx)
At SMU (Rx)
702a
702b
704a
704b
CP
CRS symbol of Cell 1
CRS symbol of Cell 2
...
$d_1$
$d_2$
$t_0$
Time
706
Single FFT window
708
Signal lost for Cell 2 (if single FFT window used)
710
Double FFT window
712a
CRS symbol replica (no CP, preferably)
712b
Zero padding
714
Extended CRS Signal

DEEP SCANNING SIGNAL MONITORING UNIT FOR DETERMINING CELLULAR NETWORK PARAMETERS

RELATED APPLICATIONS

This application claims priority to U.S. Provisional Patent Application No. 63/589,298, filed Oct. 10, 2023, all of which is incorporated herein by reference in its entirety.

BACKGROUND

In cellular communication systems, several cellular network parameters of particular significance are a cell's Physical Cell ID (PCI), Timing Offset (TO), and Carrier Frequency Offset (CFO). The PCI serves as a distinct identifier for each cell, facilitating accurate communication and handovers between cells. In contrast, the CFO represents the frequency deviation between transmitted and received signals, which, if not properly managed, can adversely affect data integrity and quality. As the architecture of cellular networks becomes more intricate, the accurate identification, management, and tracking of such parameters has become increasingly important.

SUMMARY

In some aspects, the techniques described herein relate to a method, including: receiving, by one or more processors at a signal monitoring unit, first cellular signals transmitted from a plurality of base stations within a region; performing, by the one or more processors, a first long-duration signal accumulation of the received first cellular signals; identifying, by the one or more processors, first identified cells associated with the plurality of base stations using the first long-duration accumulated signal; storing, by the one or more processors, first cellular network parameters associated with the first identified cells; removing, by the one or more processors, a signal contribution of the first identified cells from the received first cellular signals; performing, by the one or more processors, a second long-duration signal accumulation of the received first cellular signals; identifying, by the one or more processors, second identified cells associated with the plurality of base stations using the second long-duration accumulated signal, the second identified cells having been obscured by the first identified cells before the signal contribution of the first identified cells was removed from the received first cellular signals; storing, by the one or more processors, second cellular network parameters associated with the second identified cells; and tracking, by the one or more processors, the first and second cellular network parameters of the first and second identified cells respectively, the first and second cellular network parameters including respective clock frequency offsets, timing offsets, and physical cell identities of the first and second identified cells.

BRIEF DESCRIPTION OF THE DRAWINGS

FIG. 5 shows an example overview of a portion of the process for deep scanning by a signal monitoring unit, in accordance with some embodiments.

DETAILED DESCRIPTION

A deep scanning signal monitoring unit (SMU), as disclosed herein, is a receiver or scanner unit that is deployed within a region in order to determine and track critical parameters of a cellular network, such as the Physical Cell ID (PCI), Timing Offset (TO), and the Carrier Frequency Offset (CFO) corresponding to the cells within that region. Each SMU is advantageously configured to receive signals from as many cells of the cellular network as possible to thereby reduce the overall deployment and operational cost of the SMUs.

In some embodiments, the SMUs are installed at locations within the region (e.g., on towers and/or rooftops) that allow the respective SMUs to simultaneously receive cellular signals at a wide range of signal strengths from multiple transmitters of the cellular network. In order to avoid intermittent interference, each of the SMUs may be placed in a location within the region where there are no nearby pico, femto, or small cells that turn on and off regularly. In some deployment scenarios, one SMU may be placed every few kilometers, or every 100 cells (in dense areas) of a given center frequency. Upon deployment of an SMU within a region, it is assumed that the locations of the cells/towers within the region are already known and that it is not the task of the SMU to determine the physical coordinates of the cells.

In an LTE-based or 5G-NR-based cellular network, each base station of the network is associated with a Physical Cell Identification (PCI), having values ranging from 0 to 503 in the example case of 4G. A PCI identifies a particular cell in the physical layer of the LTE or 5G-NR network and is used for signal separation between transmitters. The PCI is also indicated by a primary synchronization signal (PSS) and a secondary synchronization signal (SSS). Because a cell's PCI may change over time, there is a need to deploy the SMUs within a region to track the PCI evolution. So-called deep scanning techniques disclosed herein advantageously enable each SMU to receive and process signals received from multiple cells within the region that are of significantly different signal strengths, which in turn reduces the cost of SMU deployment within the region.

Figure 1A:
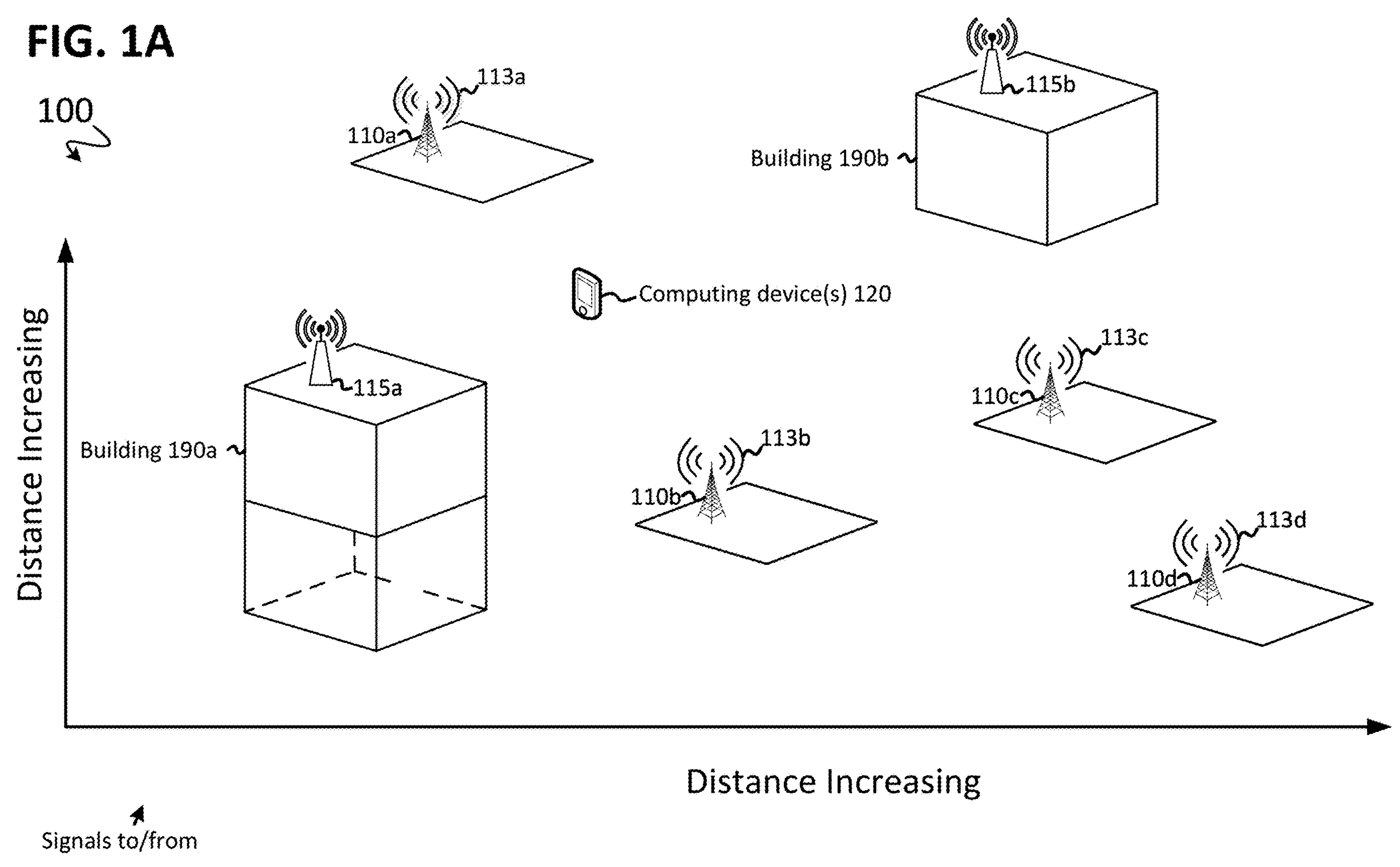
FIGS. 1A-C show an example of an operational environment for a deep scanning signal monitoring unit, in accordance with some embodiments.
Figure 1B:
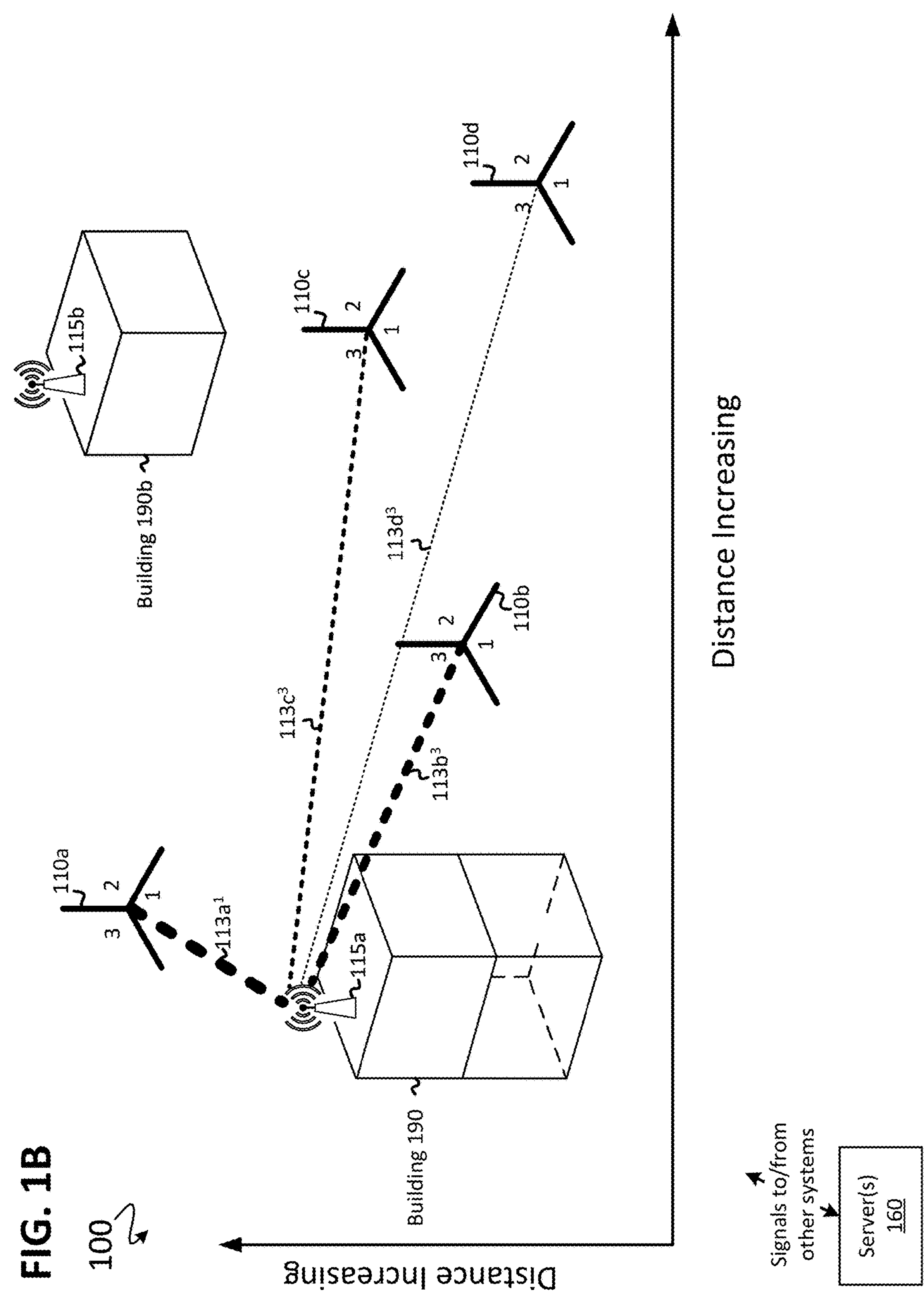
Figure 1C:
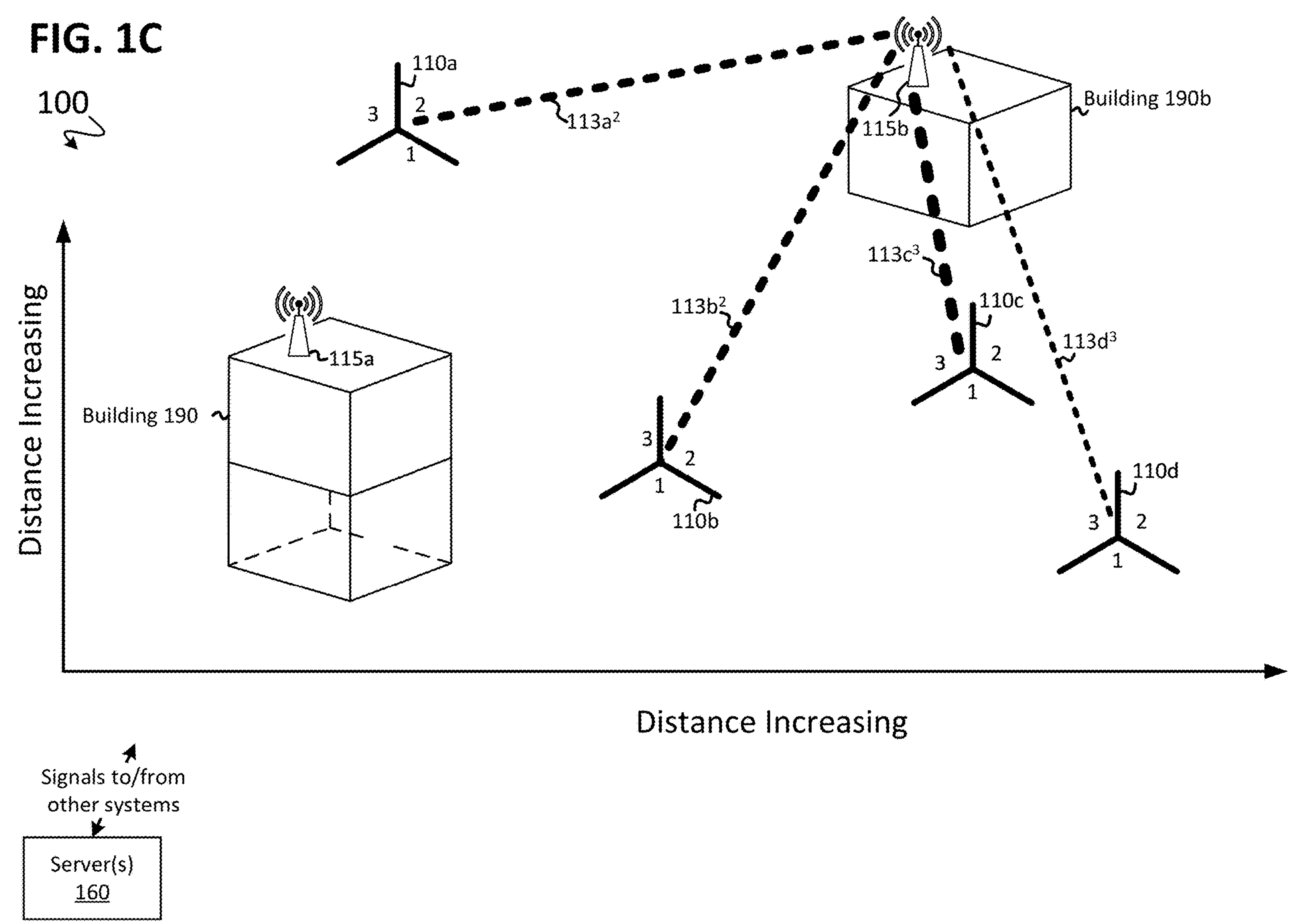

An operational environment within a region having one or more deep scanning SMUs for tracking cellular network parameters is shown in FIGS. 1A-C, in accordance with some embodiments. The operational environment 100 contains a network of cell towers/base stations 110*a-d*, example SMUs 115*a-b*, any number of computing devices 120 (e.g., a mobile phone, laptop computer, tablet, or another device), any number of buildings 190*a-b*, and any number of servers 160. FIG. 1A also shows general cellular signals 113*a-d* that are associated with the respective base stations 110*a-d*, in accordance with some embodiments.

The cell towers/base stations 110*a-d* and the SMUs 115*a-b* may be located at different altitudes within the region

100. The base stations 110*a-d* may transmit the signals 113*a-d* using one or more common multiplexing parameters—e.g., time slot, pseudorandom sequence, or frequency offset. The servers 160 and the SMUs 115*a-b* may exchange information with each other. The base stations 110*a-d* may include synchronized beacons of a wide area positioning system and may form a Code Division Multiple Access (CDMA), Time Division Multiple Access (TDMA), or Orthogonal Frequency-Division Multiple Access (OFDMA) network. The computing devices 120 are operable to exchange information with the base stations 110*a-d* and/or the servers 160 (e.g., using the cellular signals 113*a-d*).

A cell tower is a physical structure that houses antennas and other equipment used to provide wireless coverage to a geographic area. It is usually owned by a tower company and leased to wireless carriers who place their equipment on the tower. By comparison, a base station includes the equipment used to transmit and receive wireless signals between a mobile device and the network. It includes radio equipment, such as transceivers and antennas, as well as baseband processing equipment that converts digital signals into analog signals and vice versa. However, for brevity, cell towers and base stations are both referred to herein as "base stations" with the understanding that a base station may also refer to a cell tower.

In cellular communication systems, the geographical coverage area of a base station is often segmented into multiple directional areas known as "sectors". Each sector is typically served by a distinct set of antennas, oriented to cover a specific portion of the overall cell area. This segmentation allows the base station to provide directed signal coverage, thereby optimizing the use of radio resources, enhancing capacity, and reducing interference.

A sector representation (labeled '1', '2', and '3') of each of the base stations 110*a-d* is illustrated in FIG. 1B, which shows cellular signals 113*a*$^1$, 113*b*$^3$, 113*c*$^3$, and 113*d*$^3$ that are associated with particular sectors of the base stations 110*a-d* and which are received by the SMU 115*a*, in accordance with some embodiments. Similarly, FIG. 1C includes cellular signals 113*a*$^2$, 113*b*$^2$, 113*c*$^3$, and 113*d*$^3$, which are associated with particular sectors of the base stations 110*a-d* and received by the SMU 115*b*, in accordance with some embodiments.

A "cell" in the context of this disclosure refers to a transmission cell as defined by the 3GPP standard and corresponds to a particular directional antenna of a base station that provides signal coverage to a sector (e.g., a 120-degree span) of the larger geographical area (e.g., a 360-degree span) served by that base station. Each of the base stations 110*a-d* may include multiple directional antennas (not shown), one or more of which may correspond to a particular cell or sector of the region 100. Indeed, as shown in FIGS. 1B-C, each of the base stations 110*a-d* provides signal coverage to three respective 120-degree sectors, labeled 1, 2, and 3.

As described above, each of the SMUs 115*a-b* is operable to receive cellular signals from a subset of the network sectors/cells, and may include some overlapping reception for redundancy. Each of the SMUs 115*a-b* may be configured to listen to one sector out of three (for example) from a given base station. This is because a sector from a base station that is pointing towards the SMU is likely to be heard with significantly more power as compared to any of the remaining sectors of that base station that are pointing away from the SMU. In this context, the terms "listen" and "hear", in both present tense and past tense (e.g., "heard"), means to receive and process signals (such as cellular signals).

As shown by a varying thickness of the lines representing transmitted signals, the SMUs 115*a-b* may receive a different level of signal strength from each of the base stations 110*a-d*. In some instances, the levels of signal strength received at the SMUs 115*a-b* may differ based on a straight-line distance between the SMUs 115*a-b* and a particular base station, and/or based on the transmission strength of a particular base station, among other factors. With reference to FIG. 1B, the SMU 115*a* will receive signals 113*a*$^1$ transmitted from sector 1 of the base station 110*a* with a much higher signal strength as compared to signals (not shown) received from sectors 2 or 3 of the base station 110*a*. By comparison, with reference to FIG. 1C, the SMU 115*b* will receive signals 113*a*$^2$ transmitted from sector 2 of the base station 110*a* with a much higher signal strength as compared to signals (not shown) received from sectors 1 or 3 of the base station 110*a*.

At a high level, to achieve deep scanning at an SMU, each SMU accumulates signals received from a given cell until a signal-to-noise ratio of the received cellular signal is sufficient for further processing. In some embodiments, the long signal accumulation time may be 5-10 seconds, e.g., seven seconds, which is significantly longer than the signal accumulation times used in conventional cellular signal receivers. To allow for such long signal accumulation times, in some embodiments, the portion of a cellular signal frame tracked by the SMU is a repeating signal that is continuously or periodically broadcast in LTE-based and/or 5G-NR-based cellular systems.

Non-limiting examples of such repeating signals include the Cell-Specific Reference Signal (CRS) and the Positioning Reference Signal (PRS). CRS signals are transmitted over four distinct logical channels or streams, labeled as antenna ports AP0 through AP3. PRS signals are transmitted periodically or continuously in a specific time-frequency resource grid to allow for accurate positioning and location determination of user equipment, such as mobile devices. In addition to tracking the CRS or PRS signal, the SMU may need to correct for CFO drift for both the base station and the SMU itself. Similar deep scanning techniques can also be applied to other reference signals in an LTE or 5G-NR system, if such a reference signal transmission is enabled in a particular cellular network.

Figure 2:
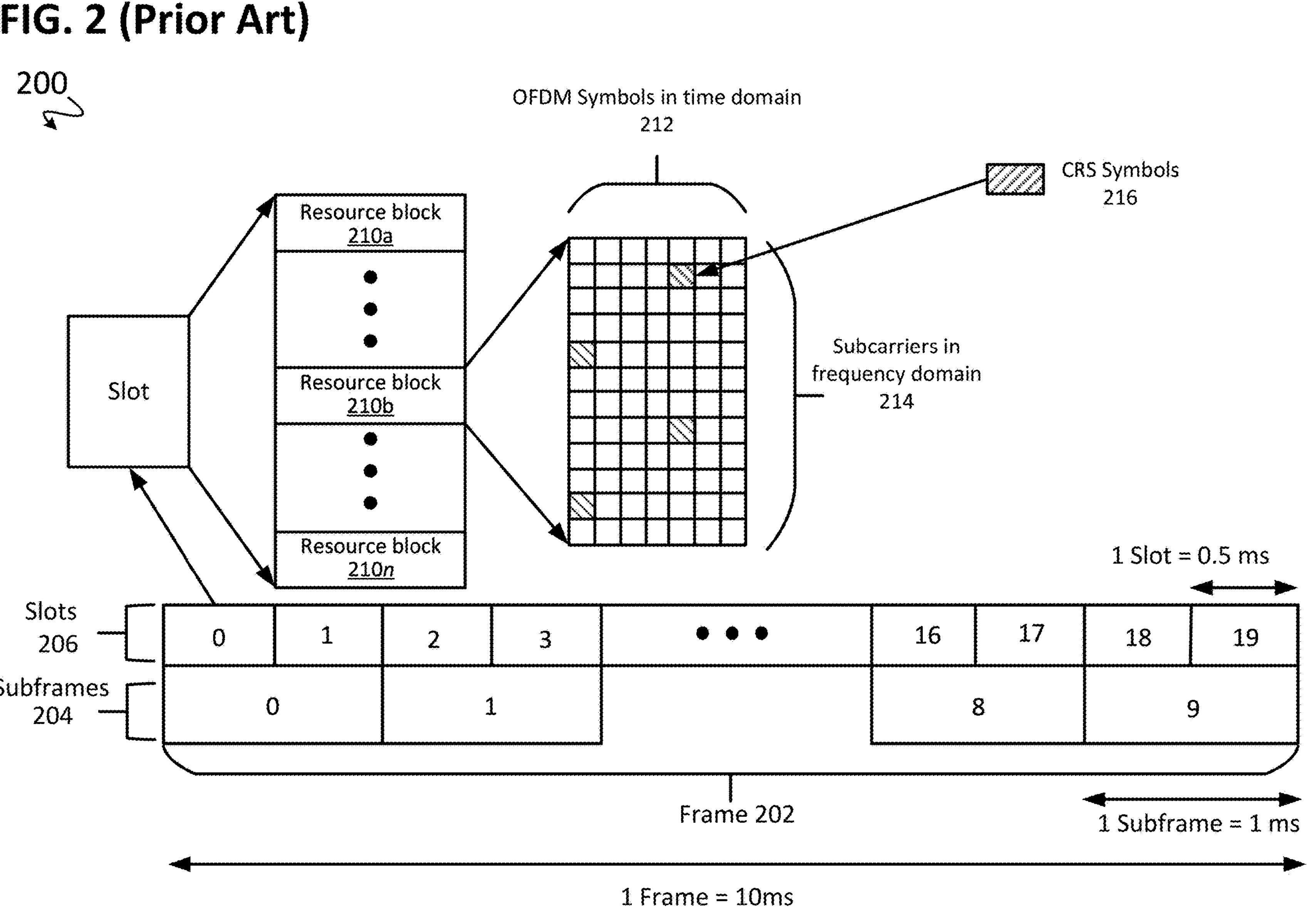
FIG. 2 shows a prior art depiction of a typical cellular signal frame in an LTE-based cellular system.

FIG. 2 shows a prior art depiction of a typical cellular signal frame in an LTE-based cellular system. A "frame" 202 is the primary structure used in LTE transmission scheduling. Each frame 202 has a duration of 10 ms and contains 10 "subframes" 204. Each subframe has a duration of 1 ms. Each of the subframes 204 contains two "slots" 206, each slot 206 having a duration of 0.5 ms.

Each of the slots 206 contains multiple resource blocks 210*a-n* that are distributed in the frequency domain, each resource block being 180 kHz wide. As such, the bandwidth of an LTE system determines the number of resource blocks per slot (e.g., a 5 MHz bandwidth provides 25 resource blocks, a 10 MHz bandwidth provides 50 resource blocks, a 20 MHz bandwidth provides 100 resource blocks, and so on).

Figure 3:
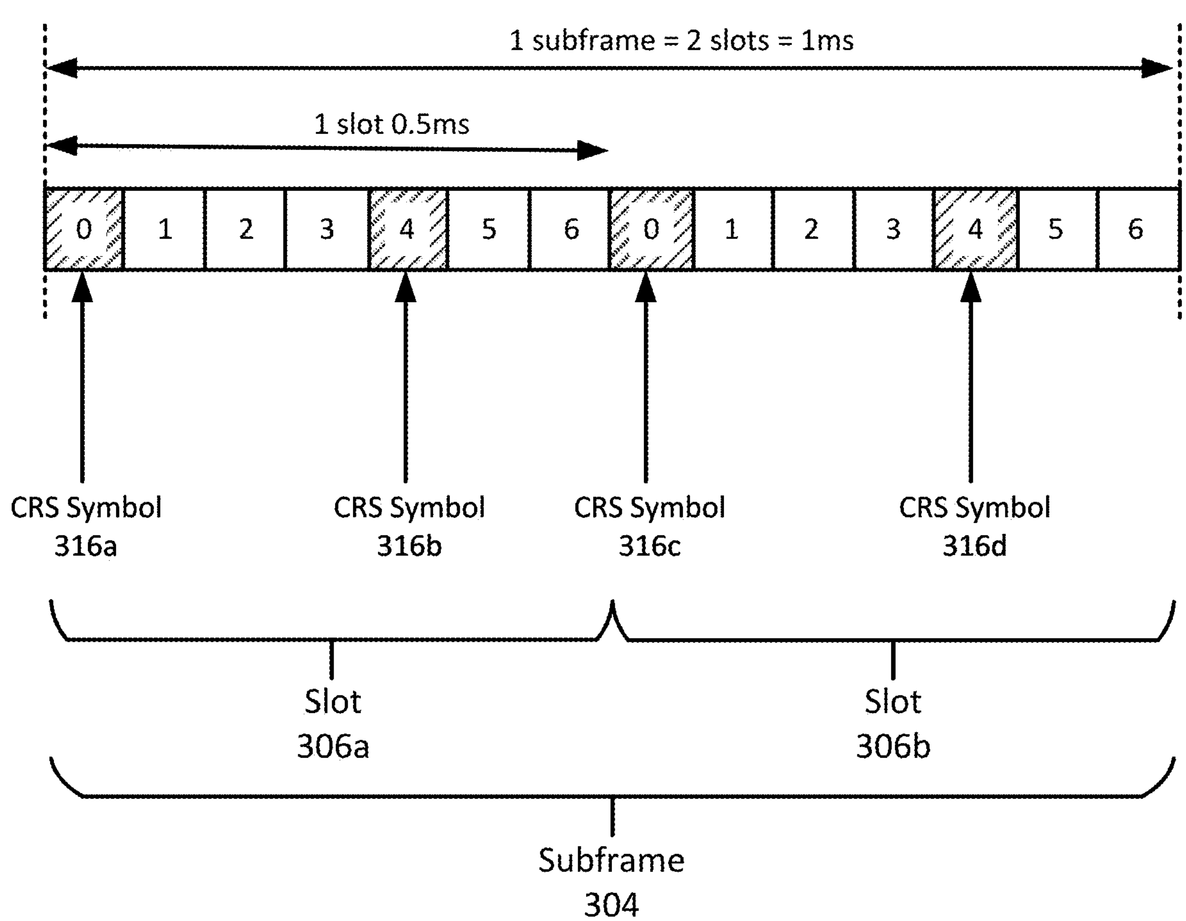
FIG. 3 shows a prior art depiction of a portion of a typical cellular signal frame in an LTE-based cellular system.

A resource block (e.g., 210*b*) may contain six or seven Orthogonal Frequency-Division Multiplexing (OFDM) symbols 212 distributed in the time domain, the number of which being dependent on the type of cyclic prefix used. Each of the OFDM symbols 212 spans 12 consecutive subcarriers 214 in the frequency domain. As shown, a CRS symbol 216 repeats in the time domain and the frequency domain for each of the resource blocks 210*a-n*. Viewed another way, FIG. 3 shows a prior art time domain depiction of an LTE subframe 304 having two slots 306*a-b*, each having respective repeating CRS symbols 316*a-d*.

As disclosed herein, an SMU advantageously attempts to determine cellular network parameters of interest (e.g., the PCI, TO, and CFO) for a given cell by only targeting the CRS symbols 316*a-d* and generally without processing other synchronization signals, such as the Primary Synchronization Signal (PSS), Secondary Synchronization Signal (SSS), or other broadcast channels like Physical Broadcast Channel (PBCH), or System Information Block (SIB) (not shown).

Note that SMU can also determine changes to cellular network parameters of interest (e.g., the PCI, TO, and CFO) for a given cell by using other reference signals such as PRS signals in an LTE or 5G-NR system, if such a reference signal transmission is enabled in a particular cellular network, without processing other synchronization signals, such as the Primary Synchronization Signal (PSS), Secondary Synchronization Signal (SSS), or other broadcast channels like Physical Broadcast Channel (PBCH), or System Information Block (SIB).

The long-duration cellular signal accumulation performed by the SMU is facilitated by using a high-quality timing source. The high-quality timing source may be an Oven Controlled Crystal Oscillator (OCXO) (or better), or a lower quality Temperature Compensated Crystal Oscillator (TCXO), the drift of which may be corrected using the timing of a nearby and strong cell and/or using a Global Navigation Satellite System (GNSS) module when GNSS signals are available. The use of GNSS synchronization is often important in the event that one or more cells begin to drift in time and confuse the SMU. Use of GNSS timing data may also be important in order to calibrate the time of arrival of various cells in environments with multipath.

In some embodiments, a crowdsourcing process may be used to determine an accurate timing offset (TO) for a cell relative to GNSS (in case it hears a delayed path rather than a Line of Sight (LoS) path). Upon determining the accurate timing offset using crowdsourced information, the SMU corrects or calibrates its estimated timing for the cell.

To elaborate, in some embodiments disclosed herein, the SMU tracks the timing offset of each base station or PCI. An initial cellular network Almanac building process, or a crowdsourcing process, provides the SMU with an initial timing offset or rough timing offset. The SMU may then, 1) calibrate the time of arrival to the provided timing offset (the time of arrival being the time of flight plus the multipath excess delay to reach the SMU; and hence, the SMU may calibrate the multipath excess delay), and 2) track the timing offset in case the timing offset begins to drift. Additionally, as described herein, in some embodiments the CFO is also tracked by the SMU so that the CFO may be cancelled or reduced in order for the SMU to accumulate received cellular signals over a long window.

Long-duration signal accumulation as disclosed herein advantageously enables the SMU to increase the received CRS signal to a signal level that is above ambient noise and interference. For example, for a 5 MHz LTE signal, long-duration signal accumulation results in a gain of 63 dB per 10 seconds of signal accumulation, for a 10 MHz LTE signal, long-duration signal accumulation results in a gain of 66 dB per 10 seconds of signal accumulation, and for a 20 MHz LTE signal, long duration signal accumulation results in a gain of 69 dB per 10 seconds of signal accumulation.

The signal accumulation time-to-gain relationship holds true when the underlying signal interference is not correlated to the desired CRS signal, which is less often than not the case—except when the underlying interference is the CRS of another cell. In such scenarios, both the desired CRS signal and the interfering CRS signal are correlated and both of the signals repeat every 10 ms. Fortunately, the desired CRS and the interfering CRS signal, being transmitted from different base stations, usually have a slightly different carrier frequency offset (CFO) (i.e., there is a different CFO between the emitting cells), which helps in reducing the contribution of an interfering CRS signal during correlation.

Without further special processing, the gain achieved by long-duration signal accumulation is conventionally limited to 10 ms of correlation over the course of one frame, i.e., 33 dB for 10 MHz. However, as disclosed herein, if the SMU advantageously coherently correlates a received signal for 5-10 seconds by tracking the CFO of the desired signal, a difference in the CFO of 0.1 Hz between the desired CRS signal and the interfering CRS signals can significantly reduce the interference. For example, at 1 GHz, a difference of 0.1 Hz is a difference of 0.1 ppb.

Note that similar long-duration signal accumulation techniques can also be applied to other reference signals such as PRS signals in an LTE or 5G-NR system, if such a reference signal transmission is enabled in a particular cellular network.

Additionally, as disclosed herein, the deep scanning SMUs advantageously use Successive Interference Cancellation (SIC) to reduce the signal contribution of strong cells in order to better hear the weak cells. A strong cell, as referred to herein, is a cell from which signals are received at a given SMU with a high signal strength and/or high signal-to-noise ratio. A weak cell, as referred to herein, is a cell from which signals are received at a given SMU with a weak signal strength and/or low signal-to-noise ratio.

Note that similar SIC techniques can also be applied to other reference signals such as PRS signals in an LTE or 5G-NR system, if such a reference signal transmission is enabled in a particular cellular network.

However, conventionally processing 5 to 10 seconds of a signal received from a base station can be considerably complex. For example, the CFO of each cell may change by 0.1 Hz or more during 5-10 seconds (or more) of long-duration signal accumulation and must be carefully tracked and accounted for as disclosed herein.

Tracking Multi-Sectors and Multi-Frequencies of a Base Station

To reduce the cost of deployment of SMUs by using a sparse deployment within a region, a given SMU may be configured to receive cellular signals from one sector out of three (for instance) from a given base station. Indeed, the sector from the tower pointing toward the SMU is likely to be received with significantly more power as compared to a sector pointing away from the SMU. In some embodiments, it may be assumed that the sectors of a base station as a group maintain their time synchronization over time because signals transmitted by the base station are derived using the same clock. However, there will be a different constant timing offset between each of the respective sectors. In some embodiments, this constant timing difference is determined using crowdsourcing or regional survey techniques (e.g., "wardriving") used during Almanac building, for example. An Almanac in this context is a data file that contains information about the location, status, and other characteristics of cellular towers and base stations in a given area. In some embodiments, the Almanac may also include parameters such as MCC, MNC, center frequency, PCI, TO, and others.

The same timing offset relationship applies to different frequencies of signals transmitted from the same sector of a given base station (there are low and high frequencies typically transmitted from each base station). However, it is sufficient for an SMU to receive and process only one, or a few, frequencies, e.g., from the low or best frequency or frequencies, to determine the timing offset of the high or other frequencies. Again, there will usually be a constant time offset per center frequency, which can be determined, in some embodiments, via crowdsourcing or using regional survey techniques.

Additionally, in some embodiments, a sudden change in the PCI of a given cell, sector, or frequency that is not being tracked may be determined via crowdsourcing as it may be too computationally costly to attempt to receive and process signals from all of the sectors of a cell and all of the frequencies as it would require a more significant deployment of SMUs within a region. In such embodiments, a process for determining a change in PCI via crowdsourcing involves using mobile devices, such as IoT (Internet of Things) devices and/or smartphones, to store a cell ID and its PCI, along with the center frequency, Mobile Country Code (MCC), and/or Mobile Network Code (MNC) in a local database at a mobile device each time the mobile device decodes such information. For example, a mobile device that hears the same cell from nearby distances can decode the Global Cell ID (CID, which rarely changes), recognize the cell, check the PCI, and report it to the location server.

The mobile device may store up to N>=1 entries, along with an associated timestamp. When cellular network parameters associated with a cell/base station, such as a new cell ID/MCC/MNC/center frequency and PCI, are determined (e.g., decoded) by a mobile device, the mobile device checks whether this information is already stored in the local database independently of the PCI (i.e., the database lookup is conducted by only considering decoded information other than the PCI). If the decoded information is not in the database, the information is stored in one of the N entries, along with the new timestamp. If all N entries were already occupied, the mobile device may replace one of the oldest entries with the new entry. However, if the entry was already in the database, the mobile device checks whether the associated PCI is the same or not. If the PCI is not the same, the PCI is updated and a flag is raised to inform a location server (e.g., of the servers 160), with high priority, of the change of PCI for this entry. The timestamp is then updated for the associated database entry (whether there is a PCI change or not).

The location server updates a database at the server based on the newly identified PCI. Furthermore, the location server may maintain a list of past observed PCIs along with their timestamps for each entry of cell ID/MCC/MNC/center frequency. This list enables the location server to identify a pattern of PCI changes for a given entry, and the timestamps of the changes. If a pattern is clearly identified (e.g., a cell has a PCI value of 0 on the weekend while having a PCI value of 1 during weekdays, and the change of PCI routinely occurs at 3 a.m.), then the location server may sometimes predict the next change of PCI even if it has not received any update from any mobile device. However, this predicted change can be flagged as "predicted", not "observed".

When the PCI of a cell being heard by the SMU changes, in principle the location server may inform the SMU of the change. Nevertheless, this kind of change could also be detected by the SMU itself. Indeed, the SMU will notice that the desired signal (the previous PCI) has disappeared or has changed significantly in timing and in channel impulse response CIR (e.g., a previous PCI has been assigned to another cell). In response, the SMU may enter a search phase to locate the possible new PCI that was assigned to the desired cell. The SMU may find a signal having similar characteristics and then it may (blindly) guess that this is the new PCI that replaced the old PCI. The similar characteristics are: similar timing, similar CIR, similar CFO, and similar power levels. Such blind guessing may require frequent and fast tracking of the cells before they could change CIR. For example, if several hours pass before the SMU rechecks the same cell, then it may be difficult for the SMU to detect a change in PCI as the channel could have changed substantially. Therefore, it is desirable for a cell to be continuously, or almost continuously tracked unless the SMU does not have sufficient processing power for this task.

As was described above, in some embodiments, the change of PCI for a cell can be confirmed by a location server via crowdsourcing. The location server may then inform the associated SMU(s) of the change of PCI for the given CID. Additionally, the SMU may maintain a local database of cells to be tracked that is consistent with a database stored in the cloud (e.g., at the location server). The SMU might detect new and unknown PCIs (by scanning all the space of PCI), but such PCIs (e.g., from a new antenna, for example) need to be confirmed by another process and incorporated in the database at the location server. The CID could be a long-term identity for a given cell (but care should be taken when the CID changes).

Figure 4:
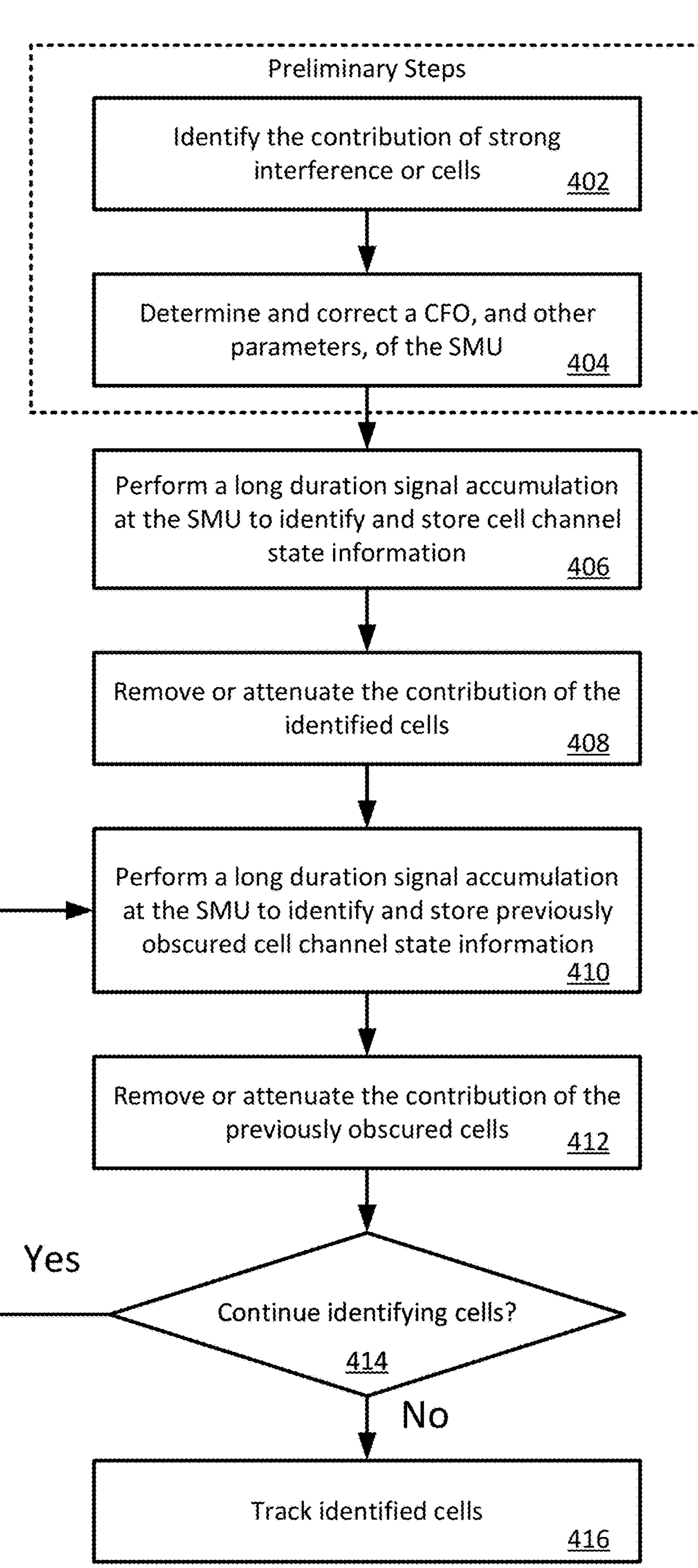
FIG. 4 shows a portion of a process for deep scanning by a signal monitoring unit, in accordance with some embodiments.

FIG. 4 provides a high-level overview of a portion of a process 400 for deep scanning by an SMU, in accordance with some embodiments. The particular steps, order of steps, and combination of steps are shown for illustrative and explanatory purposes only. Other embodiments can implement different particular steps, orders of steps, and combinations of steps to achieve similar functions or results.

The steps of process 400 may be performed by one or more processors which may be located at the SMUs 115*a-b*, the computing devices 120, and/or the servers 160.

At step 402, the SMU collects a window of 5 to 10 seconds of received cellular signals and looks for the presence of strong but unknown interference anywhere within the window. It is assumed that no automatic gain control (AGC) changes are performed at the SMU during such long-duration signal captures. As such, the AGC within an SMU should be allowed to settle before the long-duration signal captures are performed (unless AGC changes do not impact the carrier phase). This may require an ADC with a high dynamic range to account for constant changes in the signal level after the AGC is fixed. Depending on the operational region, mobile network operators own a given set of 4G bands, each defined by a central frequency Fc and Number of Resource Blocks (NRB). Knowing where the SMU is located, this information is loaded at the beginning of the process, as well as at signal capture. The cellular signals are filtered to the useful bandwidth defined by NRB, cut to keep an integer number of frames, and the SMU may additionally remove the DC component.

In some embodiments, determining the presence of strong but unknown interference may be quickly achieved by the SMU via PSS/SSS detection over each segment of 10 ms to 50 ms of captured cellular signals. Any strong cell that is detected but is unknown, over all or part of the window, can be stored in the list of cells for later SIC processing as disclosed herein (e.g., with reference to steps 408).

After determining and cataloging any strong but unknown cells and/or interference, the SMU may then identify and catalog any known strong cells. The known strong cells can be quickly found by the SMU via PSS/SSS detection via relatively short coherent correlations (e.g., of 100 ms or less).

At step 404, the SMU may subsequently determine the CFO of each of these known strong cells every 100 ms or so since the CFO can change over time. In some embodiments, the CFO of one of the strongest cells (and least changing) may be used as a reference time source by the SMU if a reliable time source such as an OCXO is not used in the SMU. In other words, the received signal is corrected for frequency offsets every 100 ms or so (while ensuring carrier phase continuity) such that the internally varying CFO of the SMU is eliminated, and one cell is considered a reference cell (its own CFO appears to be nearly zero following this operation). However, in some embodiments, it is preferable to rely on a good OXCO as the chosen reference cell may not be reliable.

Additionally, at step 404, the SMU identifies and corrects (i.e., removes) any carrier frequency offset (CFO) at the SMU itself (e.g., of a Universal Software Radio Peripheral (USRP) thereof). For this purpose, the SMU first identifies a strongest PCI by performing a Primary/Secondary Synchronization Signal (PSS/SSS) scan. That is, PSS and SSS correlations are very tolerant to frequency offsets, and because at this stage frequency alignment is not done, the SMU may need to rely on the strongest PCIs.

In some embodiments, in scenarios where the SMU detects several strong PCIs, the SMU selects the PCI that occurs the most. Also, for faster processing, the SMU may save the selected strong PCI for later use as it is likely to still be a strong PCI since the positions of the SMUs and the base stations are fixed in place.

In other embodiments, the selected strong PCI is a strongest PCI selected from several strong PCIs, from several bands/operators, with the condition that the selected strong PCI has a stable CFO over the period, relative to the other PCIs. If the strongest PCI appears to drift relative to several others, it's disqualified from selection. The SMU may then consider the next strongest PCI and determine if that PCI has a stable CFO.

After selecting a strong PCI using the PSS/SSS scan, the SMU uses the strong PCI to estimate the CFO of the USRP at the SMU. In some embodiments, the SMU proceeds per block of 10 frames (100 ms), whereupon the SMU estimates the CFO value per block. The SMU then correlates each of the block's frames with a local replica of the CRS signal. The SMU identifies the resultant correlation peaks and then performs an extended FFT (e.g., 1024 samples) of the 10 correlation peak values: 1 peak per 10 ms, and generates one CFO estimate for the 10 peaks, i.e., for 100 ms. The peak in the frequency domain is the CFO value that the SMU is seeking. As a result of the extended FFT, the SMU obtains an estimated CFO value for the USRP for each of the 10-frame blocks (100 ms).

The SMU may additionally interpolate USRP CFO values for each 10 ms frame for additional accuracy. In some embodiments, the SMU may interpolate the USRP CFO values by taking into account a first estimated CFO value for a previous 100 ms block and a second estimated CFO value for a subsequent 100 ms block segment and then estimate one CFO value per 10 ms frame. The SMU may use this interpolated CFO value to correct the USRP CFO for each frame while ensuring phase continuity between frames (10 ms), and between blocks of frames (100 ms).

At step 404, in addition to determining the CFO of each of the strongest cells every 100 ms or so, the SMU may also determine other parameters, such as their Channel Impulse Response (CIR) over the long capture window, assuming the CIR does not change over the signal capture window. The CIR characterizes the behavior and properties of a communication channel of the cellular network, including effects such as multipath propagation, where a signal can take multiple paths (due to reflections, diffractions, etc.) to reach the SMU.

In some embodiments, the SMU may use shorter sub-windows within the captured signal if the SMU determines that the CIR could change. Then, the CRS signal of the strongest cells is reconstructed by using the CIR information and the CFO information as a function of time. This reconstructed signal is subtracted from the long-duration accumulated signal in order to eliminate or reduce the interference from each of the strongest cells. More details on this topic are disclosed below.

At step 406, an SMU (e.g., the SMU 115*a*) performs a long-duration signal accumulation (e.g., 5-10 seconds, e.g., 7 seconds) of the received cellular signals to identify and store cell channel state information for each identified cell, such as that cell's MCC, MNC, center frequency, PCI, CFO, TO, and other parameters. In an example scenario, the long-duration signal accumulation is performed at the SMU using a Universal Software Radio Peripheral (USRP) (e.g., at a sampling rate of 30.72 MHz).

In some embodiments, the SMU identifies cells within the long-duration accumulated signal at steps 406 and 410 (described below) by reading the estimated cell qualities of the previous pass and selecting the cells having a quality that are above a given threshold (e.g. 23 dB above noise). In other embodiments, the SMU may search in just the first 50 ms of the long-duration accumulated signal for the strongest cells, e.g., with a quality above, e.g., 20 dB, but this option may be risky as the strong cells may be present in some but not all of the total duration of the long duration accumulated signal.

At step 408, the SMU performs a SIC process (described in detail below) for the received cellular signals (or, in an accumulated signal block, in accordance with some embodiments), to remove or attenuate the signal contribution of the previously identified strong cells and interference. In some embodiments, canceling the signal contribution of identified cells within the received cellular signals is performed per cell by first estimating the different cell paths in a correlation vector, estimating their associated channels, and subtracting the total contribution of the cell signal into the received cellular signals.

After step 408, the SMU begins a recursive process to identify previously obscured weaker cells in the received cellular signals. That is, the strong cells obscure the weaker cells' signals, and therefore the SMU recursively cancels the contribution of the strong cells in order to hear the weaker cells.

At step 410, the SMU again performs a long-duration signal accumulation of the received cellular signals (from which the signal contribution of strong cells and interference has been removed or attenuated using SIC) to identify and store cell channel state information for cells that were previously obscured by the strong cells and interference. In some embodiment, to identify the previously obscured cells within the long-duration accumulated signal, the SMU may compute the correlation for all the cells using the full long-duration accumulated signal (i.e., 5-10 seconds), post-cancellation, and then detect the peak of the correlation, and calculate the associated signal quality. The SMU then marks as detected the remaining cells whose quality is above a given threshold of signal quality (e.g., 20 dB) and which have a correlation peak that is within a margin (of, e.g., 20 dB) from the strongest cell correlation peak. In some embodiments, to determine if any cells remain in the long-duration accumulated signal, a full scan of all possible PCIs (0 to 503) is one option. Another option is to search only for a predetermined list of PCI values from a database stored at or accessed by the SMU. The predetermined list typically identifies any known PCIs in the vicinity of a respective SMU. As such, the list of PCIs may be different for every SMU and is determined/updated when changes are identified by the SMU. In some embodiments, the SMU may perform a long-term correlation for each Clock Frequency Offset (CFO) hypothesis of multiple CFO hypotheses and for each PCI in the list. Additional details are described below.

At step 412, the SIC process is performed again to remove or attenuate the contribution of any of the newly identified cells and/or interference. At step 414, it is determined at the SMU whether the SMU should continue to identify previously obscured cells. In some embodiments, the determination at step 414 is based on a configuration setting of the SMU which specifies, for example, a maximum number of iterations of steps 410 and 412 to perform, a maximum or minimum amount of cells to identify, a maximum amount of time to perform the process 400 per instance, or other parameters.

If it is determined at step 414 that the SMU should continue to identify previously obscured cells, flow of the process 400 returns to step 410. Otherwise, flow of the process 400 continues to step 416.

At step 416, the cellular network parameters (e.g., PCI, TO, and CFO) of the cells that were previously identified and marked at steps 406 and/or 410 are tracked (i.e., continually or continuously monitored) and updated in a database (e.g., at the servers 160) by the SMU. Tracking a previously acquired cell is performed by computing the channel impulse response (CIR) at an anticipated location and for the expected CFO. As the SMU has roughly determined where the time of arrival is, it is enough to oversample the area of the expected time of arrival.

After step 416, the determined and tracked cellular network parameters may be retrieved and used by elements of the associated cellular network (e.g., by user devices such as the computing devices 120) to improve cellular network communication and/or a position estimation performance as compared to such performance if the tracked cell information is not used.

To elaborate, determining the exact location of a computing device, such as a fixed device or a mobile device (e.g., a phone, laptop computer, tablet, or another device) in an environment can be quite challenging, especially when the computing device is located in an urban environment or is located within a building. Imprecise estimates of the computing device's position may have "life or death" consequences for the user. For example, an imprecise position estimate of a computing device, such as a mobile phone operated by a user calling E911, can delay emergency personnel response times. In less dire situations, imprecise estimates of the computing device's position can negatively impact navigation applications by directing a user to the wrong location or taking too long to provide accurate directions.

Efficiently and accurately determining and tracking cellular network parameters as disclosed herein, such as the CFO for a given base station, advantageously results in a more accurate estimated position of a mobile device as compared to scenarios in which such cellular parameters are not accurately determined. Thus, in some embodiments, the computing devices 120 are operable to receive the cellular network parameters determined as part of the process 400 and to subsequently use those parameters for communication with the base stations 110*a-d* as well as for multilateration of the computing devices 120 using the cellular signals 113*a-d*.

Multilateration involves solving a set of mathematical equations derived from the distances between the computing device and each of the known points (e.g., the base stations). These distances are typically calculated based on the time of arrival (TOA), time difference of arrival (TDOA), or received signal strength (RSS) of the signals emitted by the satellites or cell towers. As just one non-limiting example, because an accurate clock frequency offset value of a given base station is advantageously determined as part of the process 400, a more accurate TOA or TDOA may be determined at the computing device, and therefore a more accurate estimated position of a computing device 120 may be determined as compared to if a less accurate clock frequency offset value were used.

Detecting Previously Obscured Weak Cells

With reference to step 410, as is known in the art, the PCI in LTE is composed of two parts, the Primary Synchronization Signal (PSS) which can take one of three values: 0, 1, or 2, and the Secondary Synchronization Signal (SSS), which can take one of 168 values. Cell signals having a PCI of different remainder modulo 3 values occupy different subcarriers and are therefore orthogonal to each other. As such, any interfering cell with a PCI having a different remainder modulo 3 as compared to that of another cell will, in principle, produce significantly reduced interference with the other cell. The remaining interference is in the form of data that constantly changes and which varies in signal strength and therefore the correlation gain will reduce its impact. Nevertheless, as differences in channel delay and time delay between the cells extend beyond the cyclic prefix length, orthogonality is partially lost.

In LTE, by design, the selection of the SSS is based on the remainder when the PCI value is divided by 168, and the SSS sequences are divided into six distinct groups. This categorization aligns PCIs into groups based on their values modulo 6, ensuring that if two cells have PCIs differing by a multiple of 6, they will utilize different SSS sequences. However, most often the cells have at least two Antenna Ports (AP), and therefore another AP might have the same remainder if the modulo 6 value is considered. As such, it's the remainder of modulo 3 that usually matters.

On the other hand, for two PCIs having the same remainder modulo 3, the interference from one PCI onto another repeats as-is every 10 ms. This interference can be reduced if the CFOs are different by 0.1 Hz or more, for instance (assuming roughly 10 seconds of correlation). The interference is also reduced if SIC is performed for the interfering PCI as described above.

Assuming that a very-weak cell cannot be heard without very long-term correlation, e.g., for one or more seconds, it is desired that the CFO of the weak cell does not change over the correlation window or sub-window. By testing various CFO hypotheses (e.g., with a step size of about 0.05 Hz for a 10-second window), the very-weak cell may be detected if the CFO did not change during the correlation window.

Shortening the correlation window can help against changes in CFO but would also reduce the ability of the SMU to observe the very-weak cell. A drifting CFO hypothesis may be tried by the SMU in addition to the CFO hypotheses and the list of PCIs, but this results in a very large number of hypotheses to test. Thus, in some embodiments, the detection capability of the SMU is limited to very-weak cells having a CFO that does not change during the long-term correlation. As a result, in some time instances, the SMU may not identify the very-weak cell (due to a CFO change in the middle of the correlation window), but in other time instances, the very-weak cell may happen to be identified. It's therefore important for the SMU to perform deep scanning often so that very-weak cells are detected occasionally.

Any remaining cells (e.g., that are medium-weak) may be detected by the SMU using a shorter correlation window (e.g., with a duration of around one second) as compared to the correlation window used for the very weak cells, which is more robust against changes in cell's respective CFOs. Therefore, in some embodiments at step 410, the SMU may try different window lengths, such as a correlation window length of 100 ms for the strong cells that will be canceled or reduced via SIC, then a correlation window length of one second for medium-weak cells (followed by non-coherent accumulation of the blocks of 1 sec), and then a correlation window length of 10 seconds for the very-weak cells for fully coherent accumulation.

Details of correlation across the long capture window for detecting weak, previously obscured, cells at step 410 follow, with reference to FIG. 5.

FIG. 5 shows an example overview 500 of long-term accumulation by the SMU of received cellular signals, in accordance with some embodiments. In particular, FIG. 5 shows a long-term accumulation 506 in the time domain accomplished by implementing a series of short-term accumulation segments 504*a-d* of 10 ms cellular signal frames 502. For each of the short-term accumulations 504*a-d*, multiple 10 ms cellular signal frames 502 are accumulated at 508 to generate a respective short-term accumulation block 510. Multiple CFO hypotheses 512 are then applied to each of the short-term accumulation blocks 510. Thereafter, each short-term accumulation block having the same applied CFO hypothesis is accumulated at 514 to generate long-term accumulated blocks 516.

As one simplified example, a first CFO hypothesis 512*a* is applied to short-term accumulation blocks 510*a* and 510*b*, and a second CFO hypothesis 512*b* is similarly applied to short-term accumulation blocks 510*a* and 510*b*. The short-term accumulation blocks 510*a* and 510*b*, having the applied first CFO hypothesis 512*a*, are accumulated at 514*a* to form long-term accumulation block 516*a*. Similarly, the short-term accumulation blocks 510*a* and 510*b*, having the applied second CFO hypothesis 512*b*, are accumulated at 514*b* to form long-term accumulation block 516*b*.

To elaborate, because the CRS signal within the 10 ms frames 502 repeats, in a first step, several contiguous 10 ms frames 502 are accumulated in the time domain at 508 to reduce the amount of subsequent processing by the SMU. Thus, each of the short-term accumulated blocks 508 corresponds to 10 ms of signal in the time domain. The accumulation at 508 is performed sample-by-sample (the delay between samples being a multiple of 10 ms).

The accumulation at 508 assumes that any large CFO has been previously compensated for and the corresponding drift has been removed via resampling. The residual CFO for all macro cells versus the residual CFO of the SMU would be of the order of 1 Hz or less. As such, up to 100 ms of signal in the time domain, or even longer, may be accumulated at 508 without much loss of useful CRS information. The advantage of such accumulation is to reduce the amount of processing and memory needed in the subsequent steps shown in FIG. 5.

With reference to FIG. 5, the input to each of the accumulation stages 508 is shown as a respective 10 ms frame of the 10 ms frames 502. However, the input to the accumulation stages 508 can be a partial 10 ms frame where only the regions of CRS occasions are stored by the SMU (i.e., as described with reference to FIG. 6). The regions where there are no CRS occasions do not need to be stored by the SMU. On the other hand, the regions where there are CRS occasions should be stored by the SMU with double size (i.e., length) to account for delays from various cells (e.g., up to 20 km). A double-sized FFT region, described with reference to FIG. 6 and FIG. 7, may start as early as the earliest arriving cell, or a bit before to leave some margin, and end 4096 samples later (e.g., at a sampling rate of 30.72 Msps). These regions are stored at the SMU in the time domain before any FFT or correlation is performed by the SMU. As described with reference to FIG. 5, the SMU may accumulate the regions of interest before performing a correlation.

In some embodiments, accumulations are performed modulo 10 ms since the CRS signal repeats every 10 ms. That is, for a given CRS occasion, the SMU may accumulate that CRS occasion with a subsequent CRS occasion that lies a multiple of 10 ms later. Within a frame of 10 ms, either the full 10 ms is stored, or several CRS occasions are maintained separately as they contain different CRS sequences (i.e., leaving out the blank regions in the full 10 ms).

In some embodiments, after the short-term accumulation blocks 510 are generated, a respective FFT for each of the short-term accumulation blocks 510 is computed by the SMU to generate short-term accumulation blocks in the frequency domain. Each of the short-term accumulation blocks in the frequency domain is correlated with a local replica of the CRS signal in the frequency domain (assuming a long 10 ms block FFT, rather than a short FFT per OFDM symbol), and then an inverse FFT is performed to find the correlation result over 10 ms. This enables locating the CRS signal for any time offset.

Generally, in the United States, it is observed that time offsets within cellular signals are well aligned and are often aligned to a 1 ms boundary instead of a 10 ms boundary. Therefore, it is not always necessary to obtain the correlation over 10 ms, but only over the hundreds of samples where the correlation peak of the CRS symbol is likely to be found, modulo 1 ms.

Figure 6:
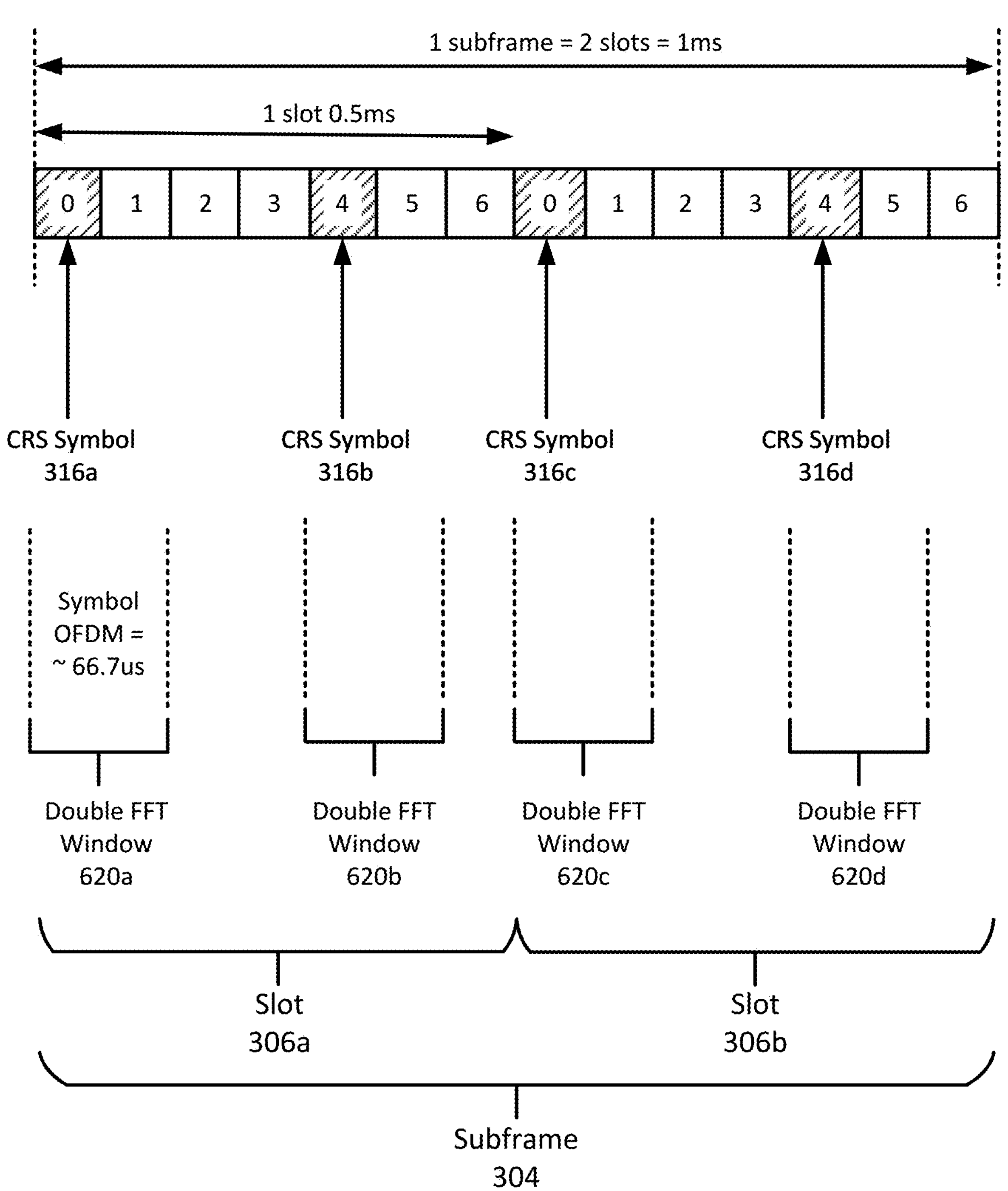
FIGS. 6-8 show aspects of deep scanning using a signal monitoring unit, in accordance with some embodiments.

A computationally efficient solution that uses a short double-sized FFT (as compared to a CRS symbol length) is described with reference to FIGS. 6-7, in accordance with some embodiments. FIG. 6 shows the LTE subframe 304 that was introduced with reference to FIG. 3, having two slots 306*a-b*, and repeating CRS symbols 316*a-d*. The short, double-sized FFT covers a short duration of 4096 samples at 30.72 Msps, i.e., 133.33 us, instead of the full 10 ms FFT. However, several short double-sized FFTs have to be applied, one per CRS occasion.

Once a (modulo) 1 ms boundary is roughly determined by the SMU, the start and end of the OFDM symbol are roughly known (e.g., 2048 samples for 20 MHz LTE, equivalent to approximately 20 km, plus 144 samples of Cyclic Prefix (CP) data, equivalent to approximately 1.5 km). However, due to potentially long delays, the OFDM symbol of a relatively farther or relatively nearer cell could fall outside of an OFDM symbol window that is configured for another cell. As such, as shown in FIG. 6, double-sized FFT windows 620*a-d* are used by the SMU, e.g., 4096 samples (equivalent to ~40 km), to cover all the necessary margins before and after the window configured for a given cell. As shown in FIG. 6, each of the double-sized FFT windows 620*a-d* is roughly aligned around a respective occurrence of the CRS symbols 316*a-d* and are sufficiently wide such that if a given CRS symbol were delayed in time, it would still occur within a respective double-sized FFT window.

Figure 7:
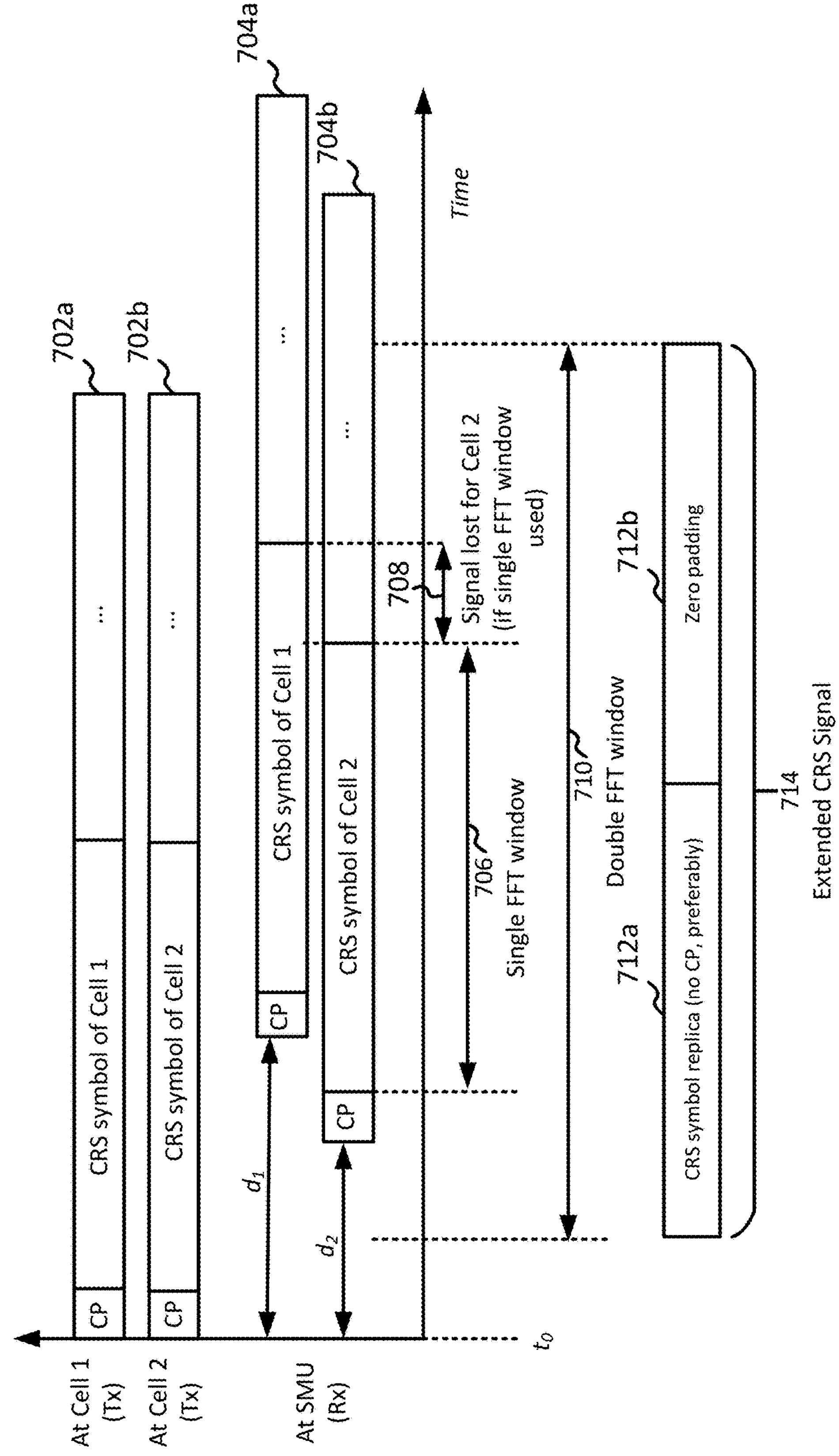

FIG. 7 illustrates additional details 700 of using double-sized FFT windows to advantageously correlate CRS symbols that may be significantly delayed in time, in accordance with some embodiments. FIG. 7 shows a portion of a first transmitted symbol 702*a* that was sent from a first cell "Cell 1" at time to, and a second transmitted symbol 702*b* that was sent from a second cell "Cell 2" at time to. Each of the transmitted symbols 702*a-b* includes a respective cyclic prefix "CP" and a CRS symbol. The first transmitted symbol 702*a* is received at an SMU after a delay of $d_1$ and is designated as a first received symbol 704*a*. Similarly, the second transmitted symbol 702*b* is received at the SMU after a delay of $d_2$ and is designated as a second received symbol 704*b*. As shown, if a single FFT window 706 is used by the SMU, due to the delay $d_2$, a portion 708 of the CRS symbol of the first received symbol 704*a* will fall outside of the single FFT window 706. By comparison, the CRS symbols of the first received symbol 704*a* and the second received symbol 704*b* are both advantageously within a double-sized FFT window 710 and therefore it is ensured that all approximately 20 km OFDM symbols of all cells fall within this approximately 40 km window. The double-sized FFT window 710 is advanced sufficiently in time so that no OFDM symbols arrive earlier than the window, and there is significant room for any later arrivals not to fall outside of the window.

A local replica of the CRS signal 712*a* (or a PRS signal) is modified by the SMU with zero-padding in the time domain 712*b* so that an extended CRS signal 714 corresponds to the double-sized FFT window 710. This is performed by inserting zeros at the end of the time domain sequence of the reference signal to extend the time domain sequence, for example, from 2048 to 4096 samples in the case of 20 MHz (optionally including the CP, or not, as it impacts the cross-correlation or cross-interference, in particular between APs of the same cell). An FFT is then applied by the SMU to the extended CRS signal 714 to generate a corresponding extended CRS signal in the frequency domain.

The extended CRS signal in the frequency domain, if the CP is not included, has the same subcarrier every $6^{th}$ subcarrier, zeros in the frequency domain where it used to have zeros, and for the newly created in-between subcarriers (the subcarrier is now 7.5 kHz instead of 15 kHz), it has some values which are interpolations obtained from the usual values. In other embodiments, the extended CRS signal is generated directly through interpolation in the frequency domain instead of by extension in the time domain followed by an FFT. Computing the double-sized FFT of the CRS pilot (or the PRS signal) may be achieved either by taking a double-sized FFT of its time domain signal as described above (i.e., padding with zeros and excluding the CP) or by interpolating directly in the frequency domain (via low pass filtering) to fill in the missing intermediate samples.

In some embodiments, interpolation in the frequency domain is accomplished by the SMU by assuming a windowed CRS signal in the time domain, where the window extends over the CP (while maintaining the Nyquist properties, i.e., when repeating the symbol, the window adds up to 1), thereby resulting in an interpolation filter in the frequency domain that is advantageously shorter than that of a sinc filter in the time domain, which corresponds to a rectangular window in the frequency domain.

The double-sized FFT processes disclosed herein may additionally be advantageously applied to the CRS or PRS signals for mobile device position estimation in 4G or 5G cellular systems independently of the SMU applications that are disclosed herein. Indeed, long delays between cells can exist for conventional positioning systems, not just for the deep scanning solution of the SMU.

Each of the 10 ms LTE frames received by the SMU may be broken into several double-sized OFDM symbols of 4096 samples each (e.g., in the case of 20 MHz or 30.72 Msps) One double-sized OFDM symbol per CRS occasion. The double-sized OFDM symbols are aligned such that they cover the OFDM symbol of each cell despite the large difference in delays between the cells (e.g., of up to 20 km). Then an FFT is computed for each of the double-sized OFDM symbols to generate a frequency domain representation of the OFDM symbols which are then correlated by the SMU with the desired replica of CRS having a double-sized OFDM symbol. The correct replica of the OFDM symbol depends on the PCI, the AP number, and the symbol index (i.e., if there is a shift by 1 ms, for example, the symbol indices rotate by 1 ms out of 10 ms).

For the next double-sized OFDM symbol, the SMU advances to the start of the respective pilot symbol (there is no need to process the in-between symbols where there is other data, represented by " . . . ", where a CRS symbol does not occur).

In some embodiments, the SMU first computes the double-sized FFT for all double-sized OFDM symbols containing a CRS signal, and then deletes the 10 ms frame blocks, replacing them with these shorter vectors. As such, the SMU may reduce the required memory for subsequent processing and may additionally reduce the total number of FFTs to perform as compared to embodiments that retain time domain data of the received OFDM symbols.

In some embodiments, the double-sized FFT operation is computed by the SMU after accumulating about 100 ms of received cellular signals. However, once the LTE frame and symbol boundaries are known, there is no need to accumulate the full 10 ms frame of signal. Instead, the SMU may accumulate the double-sized OFDM symbols (in the time domain) wherever the CRS signals are present while ensuring that all cells are well covered within the double-sized OFDM symbol. The SMU may advantageously discard other samples outside of these double-sized OFDM symbols that overlap the CRS signal.

Time Domain Correlation (IFFT)

For the SMU to correlate the received cellular signals with a given local replica associated with a particular PCI, the SMU performs a multiplication in the frequency domain of the received signal with a complex conjugate of the local PCI replica, which is similar to the PRN wipe-off in GNSS systems). The OFDM symbol in the frequency domain is of size 4096 samples or less because the edge subcarriers can be neglected (the effective bandwidth is less than 30.72 MHz, and there are 1201 subcarriers for 20 MHz with 15 kHz subcarrier, but around double this for the 7.5 kHz subcarrier; the remaining subcarriers within the 4096 point frequency domain are set to 0).

The SMU then accumulates the OFDM symbols in the frequency domain. After accumulation, the SMU applies an Inverse Fast Fourier Transform (IFFT) to the accumulated signal to obtain the correlation in the time domain. The IFFT is computed by the SMU using the double-sized FFT and therefore obtains 4096 samples (i.e., in the case of 30.72 Msps), inside of which the CIR is located.

If the SMU were to use a full 10 ms signal, then the FFT and IFFT, and the local replica would each be very large in size. When using a full-sized frame FFT and IFFT (10 ms), one advantage is that the SMU is able to detect cells that are not synchronized to a 1 ms boundary (e.g., drifting cells in asynchronous networks). In such scenarios, the SMU may observe multiple peaks in the frequency domain due to the structure of the CRS signals (i.e., there is one pilot signal every 6 subcarriers). The strongest peak is considered the peak of interest and is the peak that aligns with an OFDM symbol (the remaining peaks align with a partial OFDM symbol, like 1/6, 2/6, or 3/6 . . . of an OFDM symbol).

Multipath Mitigation

In some embodiments, the SMU may apply a process such as TOA-MF, as described in U.S. Pat. No. 10,042,037, which was issued on Aug. 7, 2018, all of which is incorporated herein by reference in its entirety, to shape the correlation output and determine the time of arrival (TOA) of the earliest hearable path. The TOA-MF may be especially effective when considering LoS signals. An alternative embodiment that may be especially effective when considering non-LoS signals involves focusing on a few strong peaks, identifying their timing, and then calibrating their timing against crowdsourced information and GNSS timing. Calibrating the timing means that the SMU estimates the multipath excess delay for the particular PCI. Such calibration enables finding the cell's timing offset by subtracting the excess delay (as well as the usual time of flight).

Successive Interference Cancellation

As disclosed above, Successive Interference Cancellation (SIC) is performed by the SMU (e.g., at steps 408 and 412 shown in FIG. 4) by i) finding the peak(s) or potential peak(s) of the CIR for strong cell(s), ii) performing joint estimation of the channels, thereby recreating their theoretical CRS signals (for one to four APs, with or without a respective CP), and then, iii) subtracting the recreated signal from the received cellular signal or the long duration accumulated signal. This advantageously reduces the amount of interference by the strong cell onto weaker cells so that the SMU can better detect the weaker cells.

There are several processes for SIC disclosed herein. Such processes may be conducted in the full 5-10 second long duration received cellular signals, in the reduced space of a 10 ms window, or in the further reduced space of a 4096 sample double-sized FFT window. The reduced space methods offer significant savings in processing and memory requirements against possibly a small loss due to CFO resolution.

Regarding step (i) of the SIC process, when a CIR of a strong cell is computed by the SMU, the SMU may identify the paths that can represent the CIR in a variety of ways. One simple way involves finding if the energy at a sampling rate that is equal to the effective bandwidth (e.g., for 20 MHz LTE, the effective bandwidth is 18 MHz) is present or exceeds a threshold amount of energy (based on design criteria of the system). One path is placed at the peak of the correlation and any remaining paths are placed at a multiple of one over the effective sampling rate if sufficient energy is sensed at that point. The SMU then uses frequency domain phase ramps to position a path at a precise point in time. These paths, e.g., numbering between 1 and 10, are almost uncorrelated (if placed at the effective sampling rate) and can be efficiently determined using joint estimation.

In order to reduce the number of paths per PCI and AP of the base stations, in some embodiments the SMU uses Multiple Signal Classification (MUSIC), Maximum Likelihood, or a similar process to finely determine the multipath components thereof and tune their positions. A resultant smaller number of multipath components are present in the observed waveform. In such embodiments, the multipath components are not positioned on a regular time grid, but may instead be positioned anywhere in time, and they generate the observed waveform with a fewer number of paths.

In some embodiments, such multipath mitigation operations are performed by the SMU per AP (e.g., 0 to 3). It is also an option for the SMU to combine the power profile of multiple APs and then find a multipath grid, or a higher-resolution multipath representation when generating the observed power profile. Optionally, if the SMU uses the MUSIC algorithm, the AP signals are combined by the SMU by generating a multipath and noise covariance matrix for the multiple APs instead of using a simple power delay profile (which is the diagonal of the covariance matrix without the cross-correlation terms).

Implementation Optimization

To reduce the complexity and memory requirements of the SMU, in some embodiments, the SMU advantageously replaces the long-duration accumulated signal (e.g., a 5-10 second signal) with a single 10 ms frame, post accumulation, per CFO hypothesis. The signal is accumulated in the time domain before the FFT or correlations are performed.

Additionally, as described with reference to FIG. 5, in some embodiments, the SMU proceeds in two (or more) steps, hierarchically. At each step, the SMU accumulates one sub-part of the long-duration accumulated signal with a single coarse CFO hypothesis, before proceeding to accumulate the full long-duration accumulated signal with multiple finer CFO hypotheses. For example, if the long duration accumulated signal is 7 seconds long, the SMU may accumulate a 100 ms block with a unique CFO hypothesis that covers up to 1 Hz or 2 Hz. Each of the blocks of 100 ms is converted to 10 ms. After this operation, the SMU has 10-times fewer frames to deal with. The SMU then proceeds to the next stage of accumulation to the full duration of the long-duration accumulated signal with finer CFO hypotheses.

The short-term accumulation refers to a first step taken by the SMU with a unique CFO correction (e.g., an average value, that may also include resampling to remove the impact of timing drift due to the CFO). The long-term accumulation refers to a second step taken by the SMU during which the SMU produces multiple CFO hypotheses.

An underlying assumption is that most base stations will have a tiny CFO value relative to some universal clock, or between each other (i.e., for a given mobile operator). For example, a difference in clock error of 0.1 ppb at 1 GHz corresponds to a delta CFO of 0.1 Hz between two base stations. This means that within 100 ms, the phase difference can be neglected without needing to perform CFO correction. However, over the long-duration accumulated signal, there is a need to perform CFO correction. As such, the SMU may assume that in an initial phase, the average CFO error of base stations relative to the SMU has been corrected, and resampling applied. This is needed if the SMU has a substantial clock difference relative to the base stations.

Model for a Given CFO Hypothesis f

To elaborate, each CFO may be modeled by the SMU using the expression:

$$y_{k,f} = z_{k,f} + \sum_{i \in S, j \in S_i} w_{i,k,f} h_{i,j} x_{i,j} \quad \text{(Equation 1)}$$

where k denotes a block index, each block corresponding to a 10 ms frame (for example), i denotes a cell from the set of hearable cells S, j denotes a time delayed path from a set of hearable multipaths $S_1$ for cell i, $x_{i,j}$ is the transmitted vector (e.g., a reference sequence or local replica) from cell i with delay index j, z is a noise vector (e.g., Gaussian), y is the received signal vector (before FFT or correlations, and includes signals from all cells), $h_{i,j}$ is a complex channel tap that is assumed to be constant over k (i.e., constant over the long-term accumulation), and $w_{i,k,f}$ is a phase rotation step modeling the residual uncorrected CFO, for a given CFO hypothesis f and given cell i, and is assumed to be identical for all channel delays j of cell i, and it is phase ramping over k with some step based on the residual uncorrected CFO, $f_i$–f.

For example, if the CFO hypothesis corresponds to the strongest cell, $f_i$=f, then for this strongest cell, the phase rotation is set to $w_{i,k,f}$=1. For another, weaker, cell, the phase rotation can be expressed as:

$$w_{i,k,f} = e^{j2\pi(f_i - f)k}. \quad \text{(Equation 2)}$$

For a given CFO hypothesis f, the SMU may average over the blocks 0≤k<K to obtain a representation of the received signal y for a CFO hypothesis f, as shown below:

$$y_f = z_f + \frac{1}{K} \sum_{i,j} h_{i,j} x_{i,j} \sum_{0 \le k < K} w_{i,k,f}. \quad \text{(Equation 3)}$$

Equation 3 may be rewritten by refactoring the phase rotation relationship, and introducing a phase rotation weight, $$w_{i,f} = \frac{1}{K} \sum_k w_{i,k,f} = \frac{1}{K} \sum_k e^{j2\pi(f_i - f)k}, \quad \text{(Equation 4)}$$

to obtain a simplified representation $y_f$ of the received signal y for a CFO hypothesis f, $$\begin{aligned} y_f &= z_f + \sum_{i,j} w_{i,f} h_{i,j} x_{i,j} \\ &= z_f + \sum_i w_{i,f} \sum_j h_{i,j} x_{i,j}. \end{aligned} \quad \text{(Equation 5)}$$

As shown in equation 5, the model has been reduced for a given CFO hypothesis to a unique block of one 10 ms frame, post accumulation. In this model, an interferer can be considered to have complex channel taps $w_{i,f}h_{i,j}$. In some scenarios, the phase rotation weight, $w_{i,f}$ is significantly less than 1, for example when the CFO of the interferer is quite far from the current CFO hypothesis. In such scenarios, the SMU may neglect some or all of the complex channel taps $w_{i,f}h_{i,j}$.

In some embodiments, the SMU may precompute the term $\Sigma_j h_{i,j} x_{i,j}$ because the taps are known for a strong cell and this does not change for various CFO hypotheses and corresponds to one block of one frame. For a given cell i, the term can be precomputed for the best CFO hypothesis, i.e., f≈$f_i$, for which $|w_{i,f \approx f_i}|$ is maximal. In some embodiments, the SMU may also precompute the phase rotation weight $w_{i,f} = \Sigma_k w_{i,k,f}$.

Using the above representation, $y_f$, of the received signal y for a CFO hypothesis f, during SIC the SMU may perform the following subtraction operation (one 10 ms frame length only) involving all strong cells and their given taps estimates $\hat{h}_{i,j}$, with $\overline{S}$ the set of strong cells, and $\overline{S}_i$ the set of strong paths for cell i:

$$y'_f = y_f - \sum_{i \in \overline{S}} w_{i,f} \sum_{j \in \overline{S}_i} \hat{h}_{i,j} x_{i,j}. \quad \text{(Equation 6)}$$

As mentioned above, the channel tap estimates $\hat{h}_{i,j}$ are obtained by the SMU for the strong paths of strong cells by performing an FFT over $y_{f \approx f_i}$, which is either of length 10 ms or a set of 4096 samples at 30.72 Msps around the CRS occasions (i.e., where the SMU applies a double-size FFT, as described above). As described above, the FFT operation is followed by a correlation or CRS wipe-off and IFFT.

In embodiments that use a double-sized FFT, the SMU accumulates the set of CRS occasions after CRS wipe-off to obtain a unique 4096 sample input to the IFFT. As shown in equation 6, these path/channel tap estimates $\hat{h}_{i,j}$ are then used to reconstruct the signal and subtract the influence of each corresponding path (after correction by the CFO hypothesis $w_{i,f}$). In the case of a set of CRS occasions, the reconstruction is performed per CRS occasion and the SMU subtracts the signal contribution per CRS occasion in order to obtain a new $$y'_f$$

signal of the same type as $y_f$ but with significant interference removed.

As described with reference to FIG. 5, if the CFO changes within the observation period, the SMU can split the observation period into smaller chunks, correct the CFO and perform channel estimation per chunk, perform SIC per chunk, and then coherently correlate multiple chunks to further improve the correlation quality.

Fourier Transform, Change of Basis

The steps above may be performed by the SMU for a CFO set, i.e., a set of (orthogonal) phase ramps having a CFO step size that is equal to one over the total duration (or less). For example, for a 7-second long-duration accumulated signal, the step is 1/7 Hz or less. I.e., f=$f_0$+nΔf where n is an integer and Δf is the step size. This appears as a Fourier transform along the k axis, per sample in the vector $y_k$. It is essentially a change of basis from time to the CFO basis. If the transform covers a sufficient number of CFO hypotheses, to cover the full energy, then the model is a simple change of basis without loss of information.

In summary, the SMU projects onto a number of equidistant CFO hypotheses, each vector being $(e^{j2\pi fk})^T$, with CFO hypothesis f=$f_0$+nΔf. In practice, a few CFO hypotheses can be enough, and the SMU may interpolate in-between them, if necessary. Therefore, the set of K frames can be replaced by a set of N CFO hypotheses. If the strong cells are estimated sufficiently well using a few CFO hypotheses (where a phase rotation weight $|w_{i,f}|>0.5$ is expected, for example) then the computational cost of SIC processing is significantly reduced. Once the complex channel tap $w_{i,f}h_{i,j}$ is estimated for a strong phase rotation weight $w_{i,f}$, the SMU can map it to another phase rotation weight $w_{i,f'}$ as the complex channel tap $w_{i,f'}h_{i,j}$.

Joint Estimation of Channel Taps

Joint estimation of channel taps involves the simultaneous estimation of discrete multipath components or 'taps' of a wireless channel. In environments exhibiting dynamic propagation characteristics, these channel taps can manifest not only as amplitude variations but also as complex values with distinct phase rotations. For the scenarios where the phase rotation weight $w_{i,f}$ is weak, it may not be prudent to jointly estimate the complex channel taps $w_{i,f}h_{i,j}$. In this case, the vectors $w_{i,f}x_{i,j}$ are weak, i.e., there is little energy for this vector inside $y_f$ for the given CFO hypothesis, and it will not lead to a good estimate of channel tap/path $h_{i,j}$.

In some embodiments, it is advantageous to estimate the channel taps $h_{i,j}$ for the CFO hypothesis where $|w_{i,f}|\approx 1$, after which the SMU may use a corrected complex channel tap $w_{i,f}h_{i,j}$ for any other CFO hypothesis, and neglect this small value.

For the case where the phase rotation weight $|w_{i,f}|\approx 1$, e.g., for the multipath of the same cell and for multipath signals from cells having similar CFOs, the SMU may determine whether joint estimation is useful or not. If the SMU selects the paths of one cell to be nearly orthogonal by carefully choosing the time delay between paths, to be equal to one over the bandwidth, then orthogonality may be good enough, and the SMU does not need to perform joint estimation.

However, if the orthogonality between pilot sequences and between delayed pilot sequences, and with some residual CFO, is not determined by the SMU to be sufficient, then the SMU may still perform joint estimation for the set of paths and cells having a phase rotation weight $|w_{i,f}|\approx 1$.

In some embodiments, the joint estimation may be performed over one frame rather than over the original long-duration accumulated signal; that is, post accumulation (or averaging) for a given CFO hypothesis. The choice of paths may be made as a single step so that the SMU does not iteratively repeat joint estimation or SIC which would significantly add to the processing power needs of the SMU.

In some embodiments, the choice of paths is obtained by the SMU for a given cell using the strongest peak, and then adding more paths where needed but only at delays which are a multiple of one over the bandwidth.

For example, for 20 MHz, i.e., the Number of Resource Blocks (NRB) equals 100 and the number of subcarriers is 1201, one over the bandwidth-delay is $$\frac{1}{1201*15e3}\approx 55.51\text{ ns, or }\frac{30.72e6}{1201*15e3}\approx 1.71$$

samples at the 30.72 Msps rate. The estimated taps are direct estimates of the complex phase rotation $w_{i,f}h_{i,j}$.

In some embodiments, the SMU implements the delays of one over the bandwidth by applying the delays in the frequency domain as a phase ramp with a precise delay.

Lossless Joint Estimation

In some embodiments, the SMU may advantageously perform nearly lossless joint estimation. Assuming a sufficiently fine grid of CFO hypotheses, the joint estimation of channel taps can be expressed as $$\hat{h}=\left(X^H X\right)^{-1}X^H y, \quad \text{(Equation 7)}$$

where the vectors and matrix $X^H$, X, and y of Equation 7 are the concatenation of the block vectors, per column, and the matrix X additionally includes the horizontal concatenation of the reference sequences, per cell i and per path j. For each cell, the corresponding CFO correction is applied by the SMU inside the matrix X in order to write the formula as above, involving one complex rotation per cell and per block, $w_{i,k,f_i}$, where $f_i$ is the CFO corresponding to cell i. It is assumed that there are not yet fine CFO corrections inside the vector y (they will be introduced in vectors $y_f$). Additionally, $\hat{h}$ is the output vector of channel estimates per cell and per path (the SMU concatenates the taps of each cell and then the cells inside the column vector $\hat{h}$).

In the formulation shown in equation 7, the reference sequences appear like long sequences that rotate based on their CFO. The differently rotating sequences (i.e., differently between two cells) confer additional orthogonality between the cells. However, the SMU does still need to perform joint estimation despite the extra orthogonality. As such, in some embodiments, the SMU performs the following low computational and/or memory cost solution.

First, $X^H y$ is refactored per row corresponding to the element $\hat{h}_{i,j}$ as $$\sum_k w_{i,k,f_i}^* x_{i,j}^H y_k = x_{i,j}^H \sum_k w_{i,k,f_i}^* y_k. \quad \text{(Equation 8)}$$

By precomputing the different sets of $$y_{f_i}=\sum_k w_{i,k,f_i}^* y_k$$

for the grid of CFO hypotheses $f_i$, this operation is reduced to the dot product $$x_{i,j}^H y_{f_i}.$$

Likewise, for the matrix product $X^H X$, each output element with indices i,j,i',j' that denote the cross-correlation between cell i, path j, and cell i', path j' may be refactored as:

$$\sum_k w_{i,k,f_i}^* x_{i,j}^H x_{i',j'} w_{i',k,f_{i'}} = x_{i,j}^H x_{i',j'} \sum_k w_{i,k,f_i}^* w_{i',k,f_{i'}}. \quad \text{(Equation 9)}$$

Using these techniques, almost lossless joint estimation may be performed by the SMU, and the matrices and vectors are essentially the size of one block instead of being the size of many blocks. In terms of memory size, the SMU needs multiple copies of $y_f$, with f having some resolution to be as near any CFO as reasonable—with minor degradation in correlation output. However, this can usually be less than the number of copies of $y_k$. Once the vectors $y_f$ are computed, the SMU may delete the long sequence $y_k$.

In some embodiments, if there is a changing CFO, the SMU may use $\phi(k)=\Sigma f(k)$ to integrate the phase, and then project onto the nearest frequency f. The final coefficient/channel can be computed and guessed for other frequencies.

State Machine

In some embodiments, the SMU uses a small state machine to make decisions on when to estimate the channel for a given cell. For example, if the CFO steps are 1/7/2 Hz (where 7 seconds is the duration of the long-duration accumulated signal), which means a maximum loss of 0.9 dB if the SMU chooses the correct CFO step, a cell's channel should be estimated either at the nearest CFO, or at the second nearest on the other side if it's not too far (with a bit more loss). The second nearest might be selected if joint estimation with another cell on that CFO hypothesis is desired.

Complementary Interference Cancellation Process

In addition to the interference cancellation by estimating and subtracting strong cells (SIC) as described above, in some embodiments, the SMU may apply a complementary process for interference cancelation. The complementary process disclosed herein is especially helpful where the SIC process does not help because the victim pilot signals are interfered with by data rather than by a CRS signal.

The process applies to the SMU for scanning cells, but also to a device's Positioning, Navigation, and Timing (PNT) operation, where it can help combat CRS or PRS interference. The complementary interference cancellation process disclosed herein involves correlating a received signal for a relatively long time (e.g., 5-10 seconds), during which the profile of data interference changes both in time and frequency. For example, a 1 ms subframe may contain 100 Resource Blocks, where a resource block is usually the unit of data allocation in 4G/5G, and typically consists of 12 subcarriers-times-14 OFDM symbols in the frequency domain. Such units of allocation may present an interference profile depending on data load, beamforming, and channel profile (toward the user of interest), Doppler of the main paths, etc. Such interference can be different for another resource block, in frequency or in time and the SMU may account for this difference.

For example, a noisy resource block may be given a lower weight by the SMU, while a resource block with less noise may be given a stronger weight by the SMU. In essence, this is not interference cancellation, but interference reduction, or interference whitening. To elaborate, in such embodiments, the first step taken by the SMU is to measure the level of data interference per resource block. This is performed either by an example process (a) which involves measuring the average power of some of the data subcarriers in each resource block, or by an example process (b) which involves measuring the variance of the victim CRS pilot over the resource block.

In the case of the example process (a), the SMU does not need to compute an FFT over symbols that do not contain CRS pilots. The FFT may be taken at the usual size (i.e., not a double-sized FFT), and aligned with the strongest cell, i.e., aligned with the data of the strongest cell, for instance, as this is where most interference would come from.

In the case of the example process (b), the SMU typically receives cellular signals from two antenna ports of a base station, with 4 CRS symbols per resource block, and therefore there are a total of 16 CRS subcarriers where the SMU may assess the level of interference. The first symbol may consist of the Physical Downlink Control Channel/Physical Control Format Indicator Channel (PDCCH/PCFICH) and may therefore have different interference characteristics. As such, it could be assessed separately.

In other embodiments, for simplicity, the SMU may combine the first symbol with the other three CRS symbols. The level of interference is the variance of the residual signal after descrambling with the victim CRS signal (the variance implies subtracting the average, which normally corresponds to the interfering CRS signal). However, the average may vary as a function of frequency and time, so this will be an approximate average.

However, the example process (b) advantageously avoids confusion between interference from data and interference from other CRS pilots and may be used in conjunction with the example process (a).

Additionally, it is sometimes important to know what is the main contributor of interference on the victim CRS: other CRS signals or other data? If it is not known by the SMU, then the example process (b) is the safer of the two example processes. In either scenario, when the data signal is very strong in the resource block relative to the victim CRS signal, and if the victim CRS signal is not underneath the strong interfering CRS signal, then the example process (a) suggests that the current resource block should be given a lower weight.

The weight function may not need to be linear as a function of the inverse of interference power (or variance). It can be a more compressed function to reduce the importance of weighting because the weighting is not being very accurately computed. An extreme example is only two weight levels, e.g., a high weight level for low interference, and a low weight level for high interference. However, it is often preferable that the weight function have more than two levels.

After determining the weights as described above, the SMU then applies the respective determined weight to the CRS pilots of the given resource block before accumulating with another resource block in time. As the SMU accumulates the signal, the SMU also maintains a total weight vector where the SMU accumulates the weights. That is, the SMU accumulates over time, per frequency resource block, $Y_f=\Sigma_t w_{f,t} Y_{f,t}$, and the SMU maintains an accumulation of the weights over time, per frequency RB: $w_f=\Sigma_t w_{f,t}$.

As described above, the effect of the weight is to whiten the interference and noise. Hence, the output $Y_f$ may be assumed to be roughly in active white Gaussian noise (AWGN). The signal model can now be expressed, per frequency subcarrier (or per RB) as $$Y_f = w_f H_f + N_f, \quad \text{(Equation 10)}$$

where $H_f$ is the channel tap, $w_f$ is the accumulated weight (cf. above), $Y_f$ is the accumulated signal, and $N_f$ is the white noise (white across all frequencies f). The CRS sequence has been wiped-off in this formulation (descrambled).

The introduction of the frequency-dependent weight $w_f$ acts like a new pilot sequence and has non-constant power. Hence, the time domain waveform carrying each tap of channel H is now the inverse Fourier transform of the vector $w_f$, instead of the inverse Fourier transform of the all-ones vector (which is a typical sinc waveform in the time domain for 4G).

Figure 8:
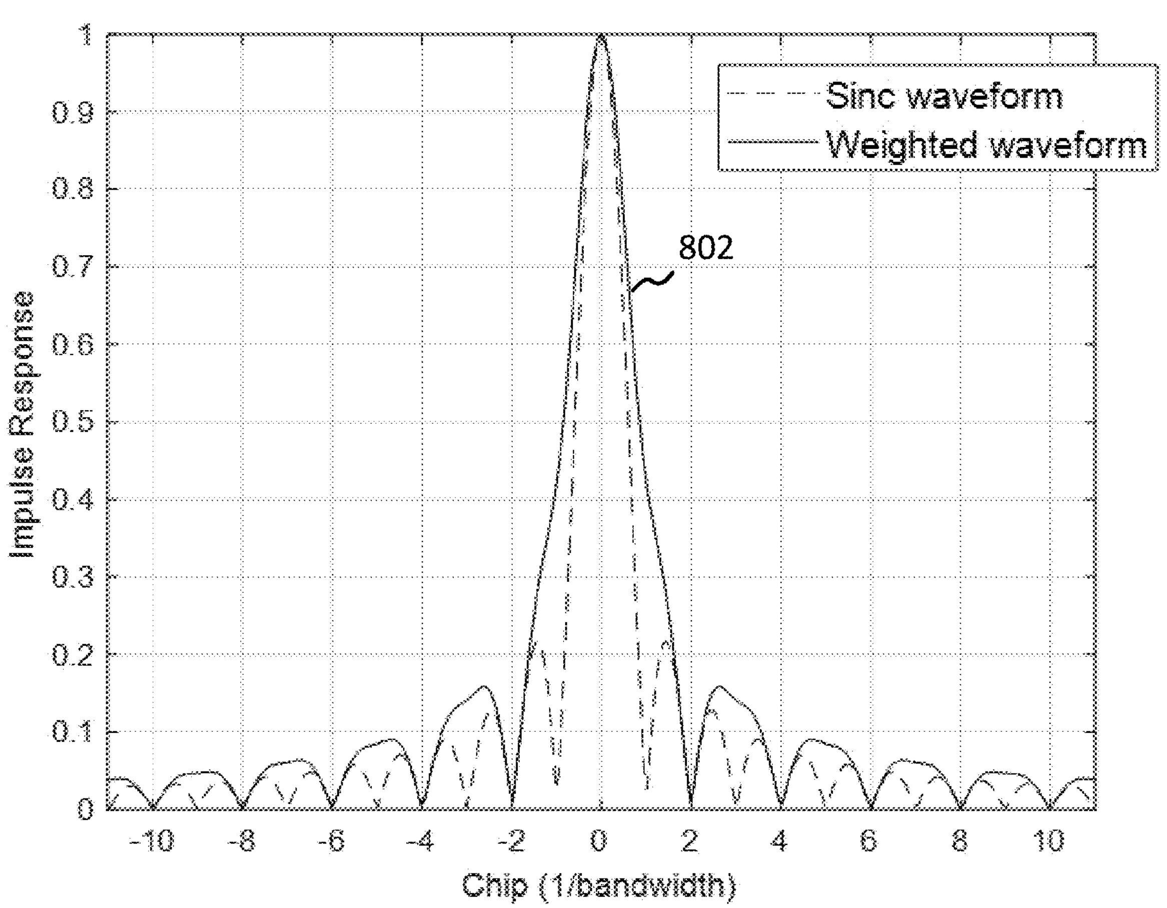

Thereafter, the goal of the SMU is to identify the first arriving pulse having this new waveform shape in the inverse Fourier transform of $w_f$. As an example, if $w_f$ is 1 for half the spectrum and 0.2 for the remaining half of the spectrum, then the oversampled inverse Fourier transform is given in the weighted waveform 802 shown in the simplified graph 800 in FIG. 8, in accordance with some embodiments.

Geographically Optimized Deployment of SMUs in a Given Area

As described above, in a mobile network, each base station is associated with a PCI that ranges from 0 to 503 in the example case of 4G. Because the cell PCI may change over time, there is a need to deploy SMUs to track the PCI evolution.

The SMU is further operable to distinguish between cells having the same PCIs using additional logic, such as determining whether a distance between the SMU and the cell matches an expected distance and timing offset, differences and tiny changes in a carrier frequency offset, etc.

With reference to FIG. 1A, each cell/sector of the base stations 110*a-d* has a unique identifier (i.e., a PCI), and may be characterized by one central frequency. When processing signals received at the respective SMUs 115*a-b*, it may be easy for the SMUs 115*a-b* to detect that a previously detected PCI has disappeared. However, it is not always possible to directly link that observation to specifically which base station has changed its PCI based on positional ambiguity.

For example, one output generated by an SMU is the Time-of-Arrival (TOA) of a received signal, which directly corresponds to a straight-line distance between the SMU and a base station. Signals received from base stations located at the same distance from the SMU may therefore be associated with identical TOAs. As such, it may be impossible to discriminate which cell has changed PCI for two equidistant cells based on determined TOAs alone.

Thus, in some embodiments, given the prior knowledge of the location of a mobile network cell, each SMU is deployed such that all distances from a base station to a given SMU are unique. Hence, each time of arrival estimated at an SMU will match solely with a single cell, making it possible to track their PCI more easily and unambiguously.

PCI Management

The SMU may hear the same PCI from two different cells and therefore may need to attempt to identify that the cells are different as compared to simply being associated with echoes or multipath from the same cell. In some embodiments, such identification may use the following criteria:

1) Substantially distant cells as observed by time of arrival, despite sufficient energy received. That is, multipath will tend to decay faster due to reflections, while a faraway cell may be heard with stronger energy without reflections or with localized clustered reflections;
2) Sufficiently different CFO estimates; and
3) Other observed changes over time, such as PCI changes that indicate the presence of different cells at the given time of arrival.

Given that a given PCI may exist for more than one cell, the SMU may need to search for the same PCI at more than one time of arrival instant. In other words, if a PCI is heard once by an SMU, the SMU may have to search for it again at other time instances.

Figure 9:
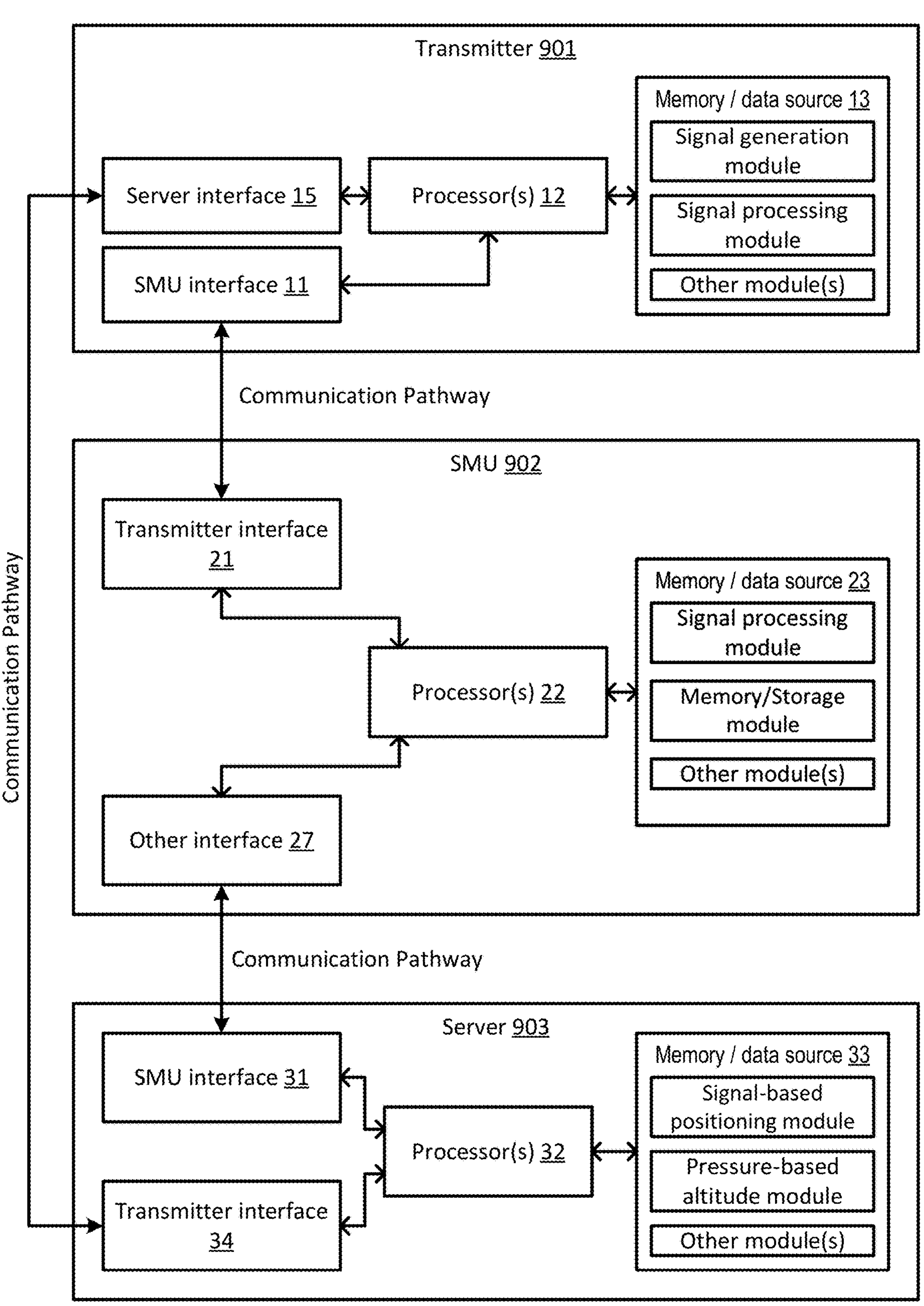
FIG. 9 provides implementation details of an example transmitter, signal monitoring unit, and server introduced in FIG. 1A, in accordance with some embodiments.

FIG. 9 illustrates components of an example transmitter 901 (e.g., one of the transmitters 110*a-d*), an example signal monitoring unit 902 (e.g., one of the signal monitoring units 115*a-b*), and an example server 903 (e.g., any one of the servers 160). Examples of communication pathways are shown by arrows between components. The components shown in FIG. 9 are operable to perform all or a portion of the process 400 and are non-limiting. That is, each of the components 901, 902, and 903 may include additional, fewer, or other modules than described herein.

By way of example in FIG. 9, each of the transmitters 901 may include a signal monitoring unit (SMU) interface 11 for exchanging information with a signal monitoring computing device (e.g., using antenna(s) and RF front-end components known in the art or otherwise disclosed herein); one or more processor(s) 12; memory/data source 13 for providing storage and retrieval of information and/or program instructions; a server interface 15 for exchanging information with a server (e.g., an antenna, a network interface, or other); and any other components known to one of ordinary skill in the art. The memory/data source 13 may include a memory storing software modules with executable instructions, and the processor(s) 12 may perform different actions by executing the instructions from the modules, including (i) performance of a part or all of the methods as described herein or otherwise understood by one of skill in the art as being performable at the transmitter; (ii) generation of positioning signals for transmission using a selected time, frequency, code, and/or phase; (iii) processing of signals received from the computing device or another source; or (iv) other processing as required by operations described in this disclosure. Signals generated and transmitted by a transmitter may carry different information that, once determined by a computing device or a server, may identify the following: the transmitter; the transmitter's position; environmental conditions at or near the transmitter; and/or other information known in the art.

By way of example in FIG. 9, the signal monitoring unit 902 may include a transmitter interface 21 for exchanging information with a transmitter (e.g., an antenna and RF front-end components known in the art or otherwise disclosed herein); one or more processor(s) 22; memory/data source 23 for providing storage and retrieval of information and/or program instructions; another interface 27 for exchanging information with the server or other devices external to the computing device (e.g., an antenna, a network interface, or other); and any other components known to one of ordinary skill in the art. A GNSS interface and processing unit (not shown) are contemplated, which may be integrated with other components (e.g., the interface 21 and the processors 22) or a standalone antenna, RF front end, and processors dedicated to receiving and processing GNSS signaling. The memory/data source 23 may include a memory (e.g., a data storage module) storing software modules with executable instructions, and the processor(s) 22 may perform different actions by executing the instructions from the modules, including all or a portion of the methods disclosed herein.

By way of example in FIG. 9, the server 903 may include an SMU interface 31 (e.g., an antenna, a network interface, or other) for exchanging information with a signal monitoring unit and/or other computing devices; one or more processor(s) 32; memory/data source 33 for providing storage and retrieval of information and/or program instructions; a transmitter interface 34 for exchanging information with a transmitter (e.g., an antenna, a network interface, or other); and any other components known to one of ordinary skill in the art. The memory/data source 33 may include a memory storing software modules with executable instructions, and the processor(s) 32 may perform different actions by executing instructions from the modules, including all or a portion of the methods disclosed herein. Steps performed by servers as described herein may also be performed on other machines that are remote from a computing device, including computers of enterprises or any other suitable machine.

Reference has been made in detail to embodiments of the disclosed invention, one or more examples of which have been illustrated in the accompanying figures. Each example has been provided by way of an explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method, comprising:

receiving, by one or more processors at a signal monitoring unit, first cellular signals transmitted from a plurality of base stations within a region;

performing, by the one or more processors, a first long-duration signal accumulation of the received first cellular signals;

identifying, by the one or more processors, first identified cells associated with the plurality of base stations using the first long-duration accumulated signal;

storing, by the one or more processors, first cellular network parameters associated with the first identified cells;

removing, by the one or more processors, a signal contribution of the first identified cells from the received first cellular signals;

performing, by the one or more processors, a second long-duration signal accumulation of the received first cellular signals;

identifying, by the one or more processors, second identified cells associated with the plurality of base stations using the second long-duration accumulated signal, the second identified cells having been obscured by the first identified cells before the signal contribution of the first identified cells was removed from the received first cellular signals;

storing, by the one or more processors, second cellular network parameters associated with the second identified cells; and tracking, by the one or more processors, the first and second cellular network parameters of the first and second identified cells respectively, the first and second cellular network parameters including respective clock frequency offsets, timing offsets, and physical cell identities of the first and second identified cells.

2. The method of claim 1, further comprising:

receiving, by a computing device within the region, the first and second cellular network parameters of the first and second identified cells; and exchanging, by the computing device, second cellular signals with the plurality of base stations using the first and second cellular network parameters.

3. The method of claim 1, further comprising:

receiving, by a computing device within the region, the first and second cellular network parameters of the first and second identified cells; and determining, by the computing device, an estimated position of the computing device using multilateration based on second cellular signals transmitted from the plurality of base stations and the first and second cellular network parameters.

4. The method of claim 1, wherein:

performing the first long-duration signal accumulation of the received first cellular signals and the second long-duration signal accumulation of the received first cellular signals comprises accumulating a Cell-Specific Reference Signal or Positioning Reference Signal of the first cellular signals.

5. The method of claim 4, wherein: the first long-duration signal accumulation of the received first cellular signals and the second long-duration signal accumulation of the received first cellular signals increase a respective signal level of the Cell-Specific Reference Signal or Positioning Reference Signal to a respective signal level that is above ambient noise and interference signal levels.

6. The method of claim 4, wherein: each accumulated Cell-Specific Reference Signal or Positioning Reference Signal is associated with a respective resource block; and a respective weight is applied to each resource block before accumulation the performing of the first long-duration signal accumulation of the received first cellular signals and the second long-duration signal accumulation of the received first cellular signals.

7. The method of claim 6, wherein:

the respective weight is determined based on a determined amount of signal interference in the received first cellular signals.

8. The method of claim 4, further comprising:

generating, by the one or more processors, a plurality of short-term accumulation blocks of accumulated cellular signal frames of the received first cellular signals;

calculating, by the one or more processors, a respective Fast Fourier Transform for each of the short-term accumulation blocks to generate respective short-term accumulation blocks in the frequency domain;

correlating, by the one or more processors, each of the short-term accumulation blocks in the frequency domain with a local replica of the Cell-Specific Reference Signal or Positioning Reference Signal in the frequency domain; and generating, by the one or more processors, an inverse Fast Fourier Transform of the correlated short-term accumulation blocks in the frequency domain to locate the Cell-Specific Reference Signal or Positioning Reference Signal in the first cellular signals.

9. The method of claim 8, wherein:

each respective Fast Fourier Transform is calculated using a window length that is at least double the length of a symbol length corresponding to the Cell-Specific Reference Signal or Positioning Reference Signal.

10. The method of claim 9, wherein:

the local replica of the Cell-Specific Reference Signal or Positioning Reference Signal in the frequency domain is generated using a zero-padded reference signal in the time domain, by the one or more processors, such that a length of the zero-padded Cell-Specific Reference Signal or Positioning Reference Signal is the same as the length of the Fast Fourier Transform window.

11. The method of claim 1, further comprising:

determining, by a computing device within the region, third cellular network parameters and a physical cell ID (PCI) value associated with a base station of the plurality of base stations;

determining, by the computing device, if the third cellular network parameters are already stored in a database independently of the PCI value;

upon determining, by the computing device, that the third cellular network parameters are stored in the database, determining, by the computing device, if a previous PCI value stored in the database in association with the third cellular network parameters is the same as the PCI value; and upon determining, by the computing device, that the previous PCI value stored in the database is not the same as the PCI value, transmitting the PCI value to a location server that is in signal communication with the first signal monitoring unit.

12. The method of claim 11, further comprising:

upon determining, by the computing device, that the third cellular network parameters are not stored in the database, storing, by the computing device, the third cellular network parameters and PCI values in the database with an associated timestamp.

13. The method of claim 1, wherein performing the first long-duration signal accumulation of the received first cellular signals comprises:

generating a plurality of short-term accumulation blocks of accumulated cellular signal frames of the received first cellular signals using a single first clock frequency offset (CFO) hypothesis; and generating a plurality of long-term accumulation blocks by accumulating each of the plurality of short-term accumulation blocks using a plurality of second CFO hypotheses.

14. The method of claim 1, wherein performing a first long-duration signal accumulation of the received first cellular signals comprises:

generating, by the one or more processors, a plurality of short-term accumulation blocks of accumulated cellular signal frames of the received first cellular signals;

for each short-term accumulation block of the plurality of short-term accumulation blocks, modeling, by the one or more processors, the received first cellular signals based on at least a respective uncorrected clock frequency offset (CFO) hypothesis and a respective channel tap estimate for each base station of the plurality of base stations;

for each uncorrected CFO hypothesis, averaging over the short-term accumulation blocks, by the one or more processors, to determine a representation of the received first cellular signals based on that uncorrected CFO hypothesis; and using, by the one or more processors, the representation of the received first cellular signals at the subsequent step of removing the signal contribution of the first identified cells from the received first cellular signals.

15. The method of claim 1, wherein performing a first long-duration signal accumulation of the received first cellular signals comprises:

generating, by the one or more processors, a plurality of short-term accumulation blocks of accumulated cellular signal frames of the received first cellular signals;

applying, by the one or more processors, a plurality of CFO hypotheses to each short-term accumulation block of the plurality of short-term accumulation blocks; and generating a plurality of long-term accumulation blocks by accumulating each of the plurality of short-term accumulation blocks having the same CFO hypothesis.

16. The method of claim 1, wherein identifying the first cells using the first long-duration accumulated signal comprises:

detecting, by the one or more processors, one or more Primary Synchronization Signals and Secondary Synchronization Signals in cellular signal frames of the received first cellular signals.

17. The method of claim 1, wherein removing the signal contribution of the first identified cells from the received first cellular signals comprises:

estimating, by the one or more processors, a plurality of cellular signal paths for that cell in a correlation vector;

estimating, by the one or more processors, associated cell channels to generate a total estimated signal contribution of that cell; and subtracting, by the one or more processors, the total estimated signal contribution of that cell signal from the received first cellular signals.

18. The method of claim 1, wherein removing the signal contribution of the first identified cells from the received first cellular signals comprises:

determining, by the one or more processors, peak channel impulse response values for a plurality of channels associated with the first identified cells from the received cellular signals;

performing joint estimation of the plurality of channels, by the one or more processors, to determine a recreated cellular signal; and subtracting, by the one or more processors, the recreated cellular signal from the received first cellular signals.

19. The method of claim 18, wherein determining the peak channel impulse response values comprises:

determining, by the one or more processors, an amount of energy present in the received first cellular signals at an effective sampling rate that is equal to an effective bandwidth of the received first cellular signals;

determining, by the one or more processors, if the amount of energy present in the received first cellular signals at the effective sampling rate exceeds a threshold amount of energy; and upon determining that at least the threshold amount of energy is present in the received first cellular signals:

estimating, by the one or more processors, a first cellular signal path to be at a correlation peak of the first cellular signals; and estimating, by the one or more processors, a plurality of second cellular signal paths at respective multiples of one over the effective sampling rate.

20. The method of claim 18, wherein performing joint estimation of the plurality of channels to determine a recreated cellular signal comprises:

generating, by the one or more processors, a matrix comprising a horizontal concatenation of respective Cell-Specific Reference Signals or Positioning Reference Signals per cell and per path;

applying, by the one or more processors, a clock frequency offset (CFO) correction for each cell in the matrix; and determining, by the one or more processors, an estimated complex channel tap for each cell and each path using the matrix.

21. The method of claim 1, wherein identifying the second cells using the second long-duration accumulated signal comprises:

computing, by the one or more processors, a respective correlation for a plurality of cells in the second long-duration accumulated signal;

detecting, by the one or more processors, a plurality of correlation peaks;

determining, by the one or more processors, a respective cellular signal quality associated with each correlation peak; and upon determining, by the one or more processors, that a cellular signal quality of a cell of the plurality of cells in the second long-duration accumulated signal is above a threshold of signal quality, identifying that cell as a cell of the second cells.

* * * * *